(12) United States Patent
Rabbani

(10) Patent No.: US 10,150,096 B2
(45) Date of Patent: Dec. 11, 2018

(54) HETEROATOM RICH ORGANIC POLYMERS WITH ULTRA-SMALL PORE APERTURES FOR CARBON DIOXIDE SEPARATION AND/OR CONVERSION

(71) Applicant: WISYS TECHNOLOGY FOUNDATION, INC., Madison, WI (US)

(72) Inventor: Mohammad G. Rabbani, Platteville, WI (US)

(73) Assignee: WISYS TECHNOLOGY FOUNDATION, INC., Madison, WI (US)

( * ) Notice: Subject to any disclaimer, the term of this patent is extended or adjusted under 35 U.S.C. 154(b) by 0 days.

(21) Appl. No.: 15/463,141

(22) Filed: Mar. 20, 2017

(65) Prior Publication Data
US 2018/0264436 A1  Sep. 20, 2018

(51) Int. Cl.
| | |
|---|---|
| B01D 53/02 | (2006.01) |
| B01D 53/22 | (2006.01) |
| B01D 53/86 | (2006.01) |
| B01J 20/26 | (2006.01) |
| B01J 20/28 | (2006.01) |
| B01J 31/06 | (2006.01) |

(52) U.S. Cl.
CPC ............ B01J 20/262 (2013.01); B01D 53/02 (2013.01); B01D 53/228 (2013.01); B01D 53/8671 (2013.01); B01J 20/2808 (2013.01); B01J 31/06 (2013.01); *B01D 2253/202* (2013.01); *B01D 2257/504* (2013.01)

(58) Field of Classification Search
CPC ...... B01J 20/262; B01J 20/2808; B01J 31/06; B01D 53/02; B01D 53/228; B01D 53/8671; B01D 2253/202; B01D 2257/504; B10D 53/228
See application file for complete search history.

(56) References Cited

U.S. PATENT DOCUMENTS

| | | | |
|---|---|---|---|
| 2011/0160511 A1* | 6/2011 | Hupp | C07C 7/12 585/823 |
| 2015/0059579 A1* | 3/2015 | Park | B01D 71/64 96/14 |
| 2016/0016108 A1* | 1/2016 | Park | B01D 53/12 95/148 |

OTHER PUBLICATIONS

Pyles et al., "Synthesis of Benzobisoxazole-Linked Two-Dimensional Covalent Organic Frameworks and Their Carbon Dioxide Capture Properties," ACS Macro Lett., 2016, 5 (9), pp. 1055-1058 (Year: 2016).*

Xie et al., "Capture and conversion of CO2 at ambient conditions by a conjugated microporous polymer," Nature Communications, 1960 (2013). pp. 1-7 and supplemental information (Year: 2013).*
Talapaneni et al., "Nanoporous Polymers Incorporating Sterically Confined N-Heterocyclic Carbenes for Simultaneous CO2 Capture and Conversion at Ambient Pressure," Chem. Mater. 2015, 27, 6818-6826. (Year: 2015).*
Overview of Greenhouse Gases: http://www3.epa.gov/climatechange/ghgemissions/gases/co2.html.
Baker et al., "Natural Gas Processing With Membranes: An Overview", Ind. Eng. Chem. Res. 2008, 47, 2109-2121.
Kenarsari et al., "Review of recent advances in carbon dioxide separation and capture", RSC Adv. 2013. 3, 22739.
Yang et al., "Progress in carbon dioxide separation and capture: A Review", Journal of Environmental Sciences 20 (2008) 14-27.
Algoma Algal Biotechnology LLC, http://www.algomaalgal.com/.
Isoprene from Biomass: http://www.wisys.org/news-media/eric-singsaas.
Freedonia, Membrane Separation Technologies—Industry Study with Forecasts for 2016 & 2021. The Freedonia Group Inc. 2012; http://www.freedoniagroup.com/brochure/28xx/2872smwe.pdf.
Rabbani et al, "Synthesis and Characterization of Porous Benzimidazole-Linked Polymers and Their Performance in Small Gas Storage and Selective Uptake", Chem. Mater. 2012, 24, 1511-1517.
Sekizkardes et al., "Highly Selective CO2 Capture by Triazine-Based Benzimidazole-Linked Polymers", Macromolecules 2014, 47, 8328-8334.
Xu et al., "Conjugated microporous polymers: design, synthesis and application", Chem, Soc. Rev., 2013, 42, 8012.
Chang et al., "Microporous organic polymers for gas storage and separation applications", Phys. Chem. Chem. Pys., 2013, 15, 5430.
Damson et al., "Nanoporous organic polymer networks", Progress in Polymer Science 37 (2012), 530-563.
Dawson et al., "Microporous organic polymeres for carbon dioxide capture", Energy Environ, Sci., 2011, 4, 4239.
Li et al., "Nitrogen-Rich Porous Adsorbents for CO2 Capture and Storage", Chem. Asian J. 2013, 8. 1680-1691.
Patel et al., "Unprecedented high-temperature CO2 selectivity in N2-phobic nanoporous covalent organic polymers", Nat Commun 2013, 4:1357.
Schwab et al., "Catalyst-free Preparation of Melamine-Based Microporous Polymer Networks through Schiff Base Chemistry", J. Am. Chem.Soc, 2009, 131, 7216-7217.
Pyles et al., "Synthesis of Benzobisoxazole-Linked Two-Dimensional Covalent Organic Frameworks and Their Carbon Dioxide Capture Properties", ACS Macro Lett, 2016, 5, 1055-1058.

* cited by examiner

*Primary Examiner* — Pancham Bakshi
*Assistant Examiner* — Mark R Luderer
(74) *Attorney, Agent, or Firm* — Boyle Fredrickson, S.C.

(57) ABSTRACT

A heteroatom (N,S,O)-rich porous organic polymer and a membrane-based separation system and process employing the polymer is provided that utilizes one of a number of the heteroatom-rich porous organic polymers which contain ultra-small pores in their structures. The polymers can be used in the membranes to form a simpler, easy to regenerate separation system and method that and does not involve phase changes in the operation of the system. The system with the functionalized nanoporous organic polymer(s) can be utilized as a nanoporous membrane composite(s) for $CO_2$ gas separation, or in the formation of a heterogeneous catalyst to convert $CO_2$ to useful chemicals.

19 Claims, 14 Drawing Sheets

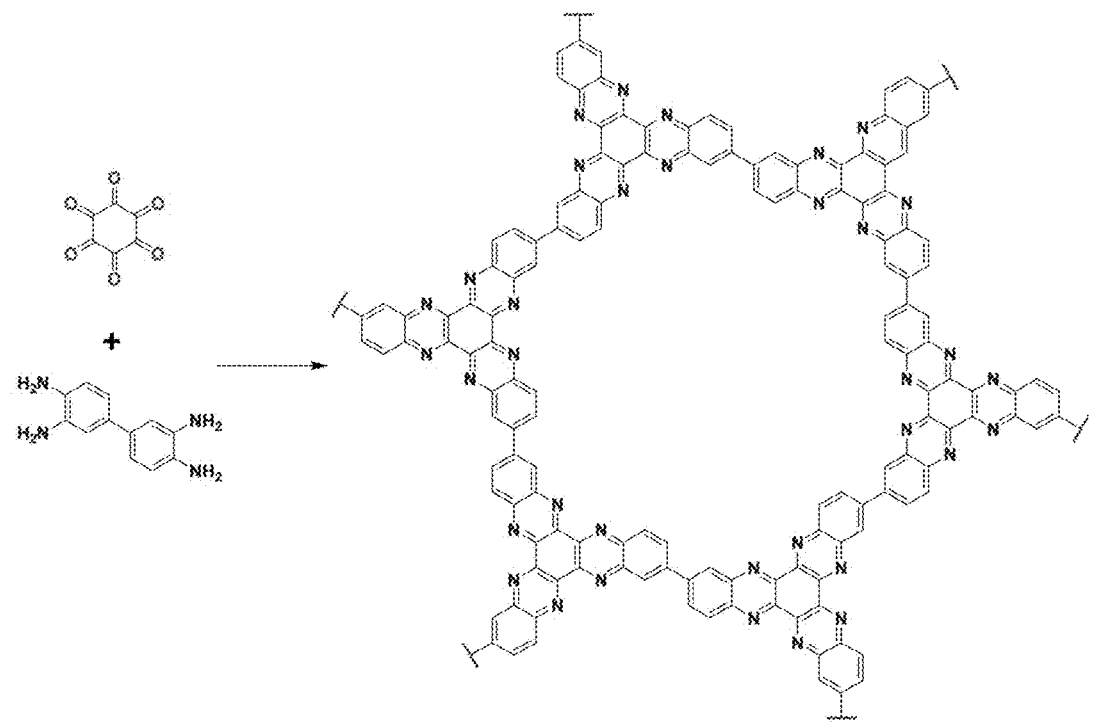
Figure 1: Scheme for the synthesis of a PLP-1.
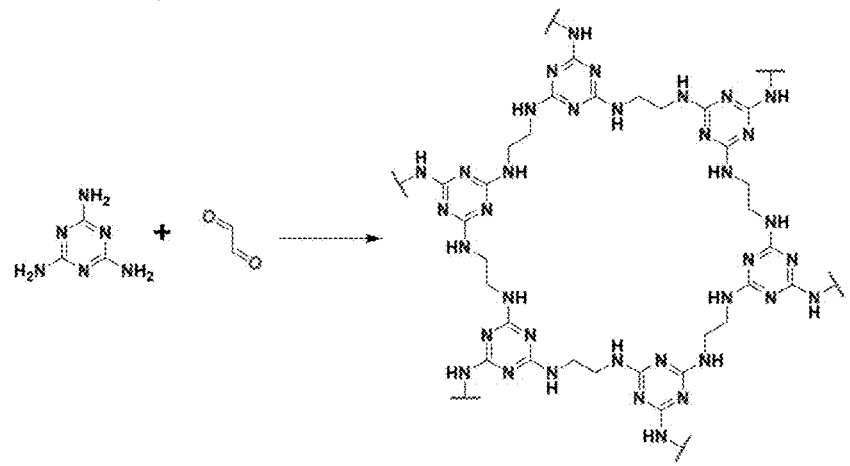
Figure 2: Scheme for the synthesis of a GDP-1.

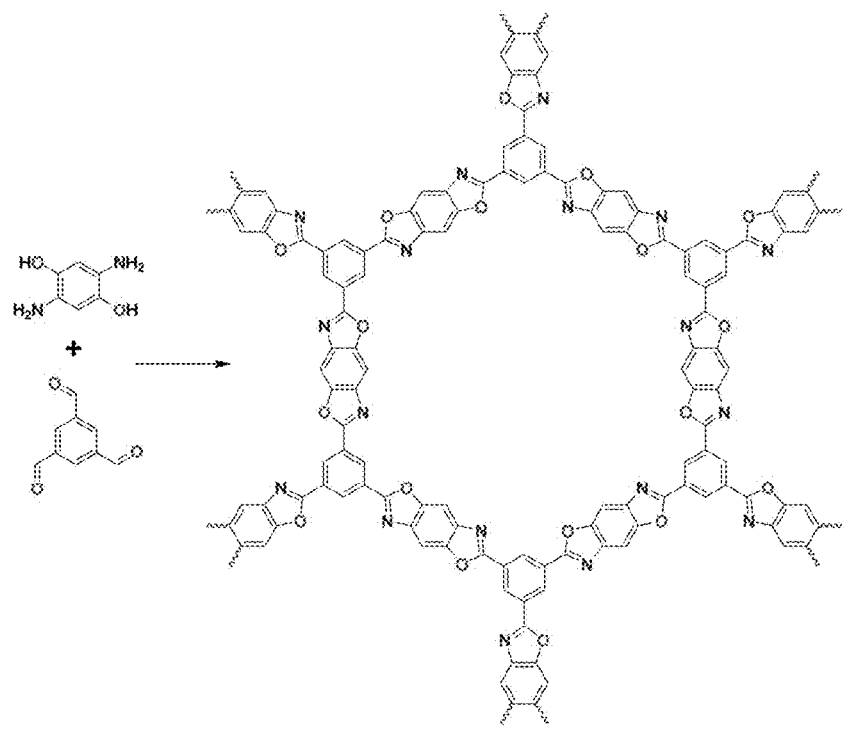
Figure 3: Scheme for the synthesis of a BOLP-1.
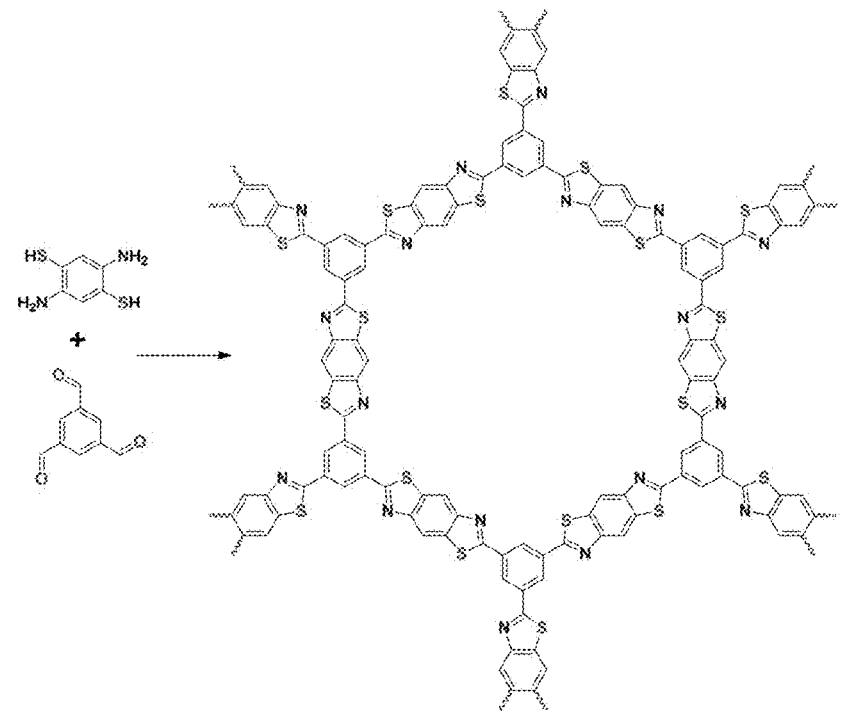
Figure 4: Scheme for the synthesis of a BTLP-1.

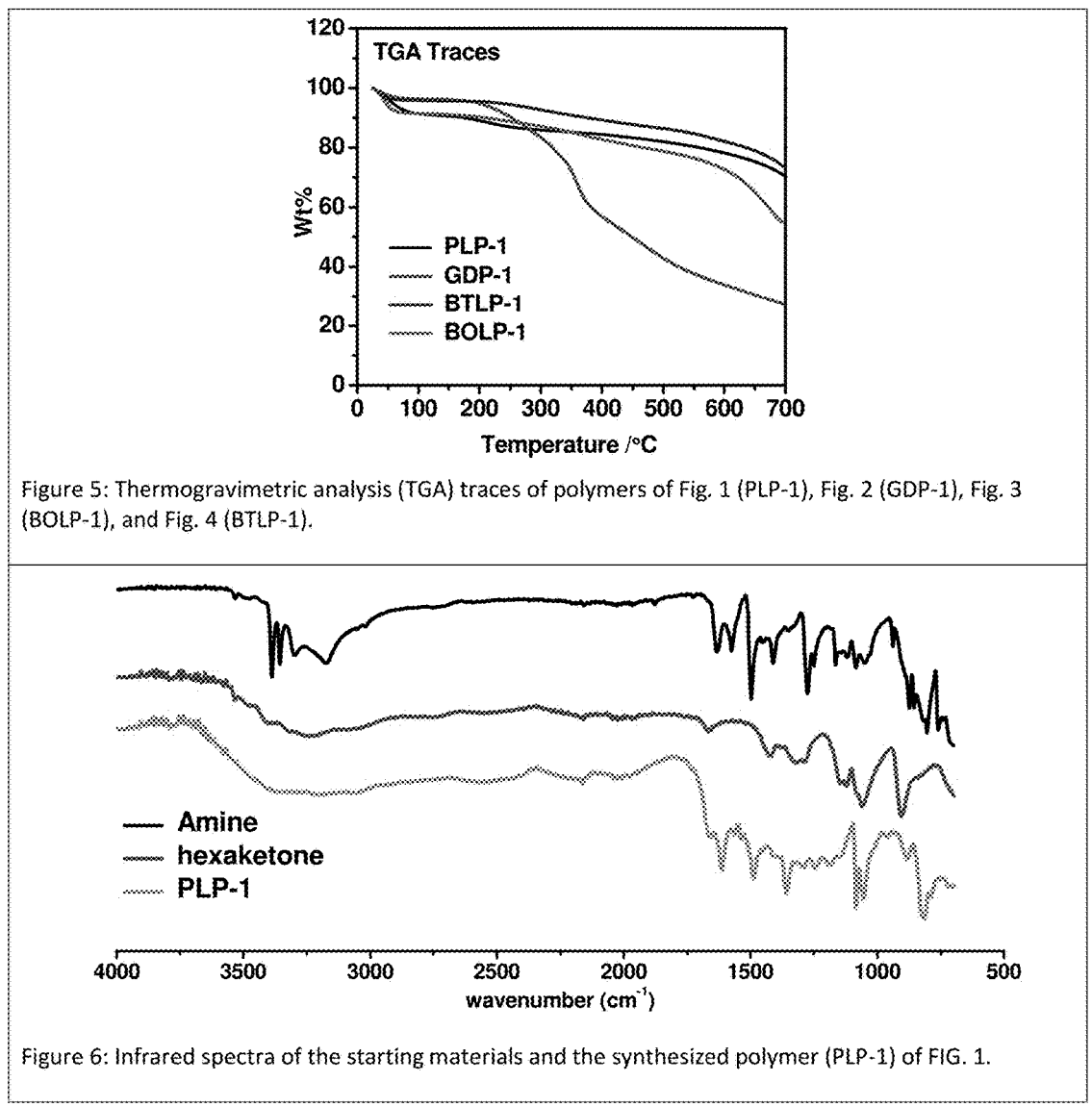
Figure 5: Thermogravimetric analysis (TGA) traces of polymers of Fig. 1 (PLP-1), Fig. 2 (GDP-1), Fig. 3 (BOLP-1), and Fig. 4 (BTLP-1).
Figure 6: Infrared spectra of the starting materials and the synthesized polymer (PLP-1) of FIG. 1.

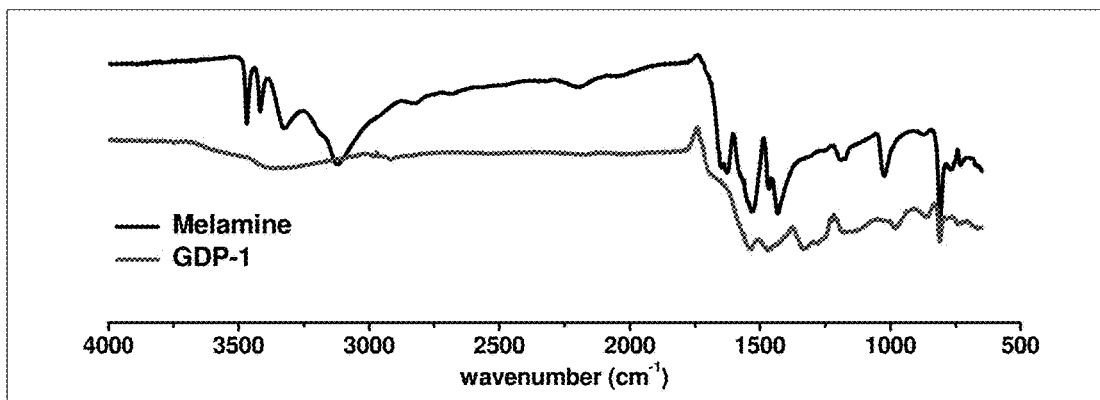
Figure 7: Infrared spectra of the starting materials and the synthesized polymer (GDP-1) of FIG. 2.
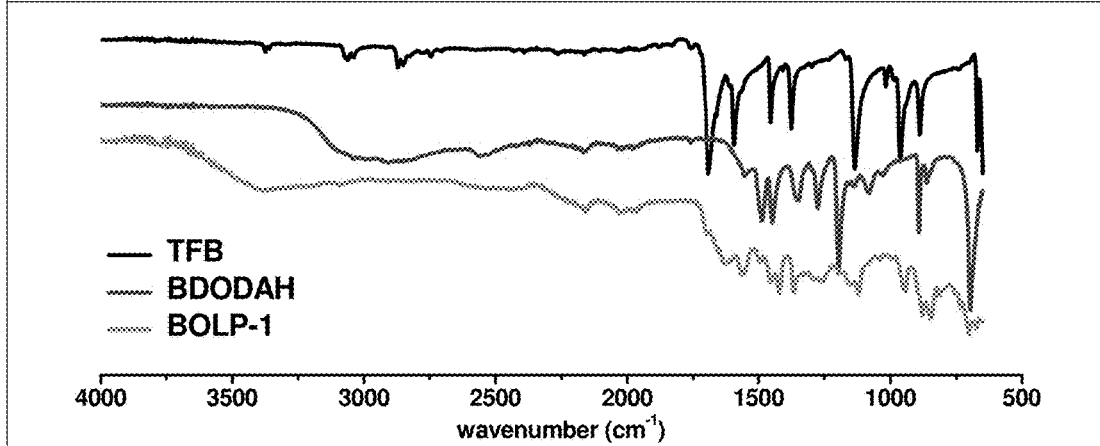
Figure 8: Infrared spectra of the starting materials and the synthesized polymer (BOLP-1) of FIG. 3.
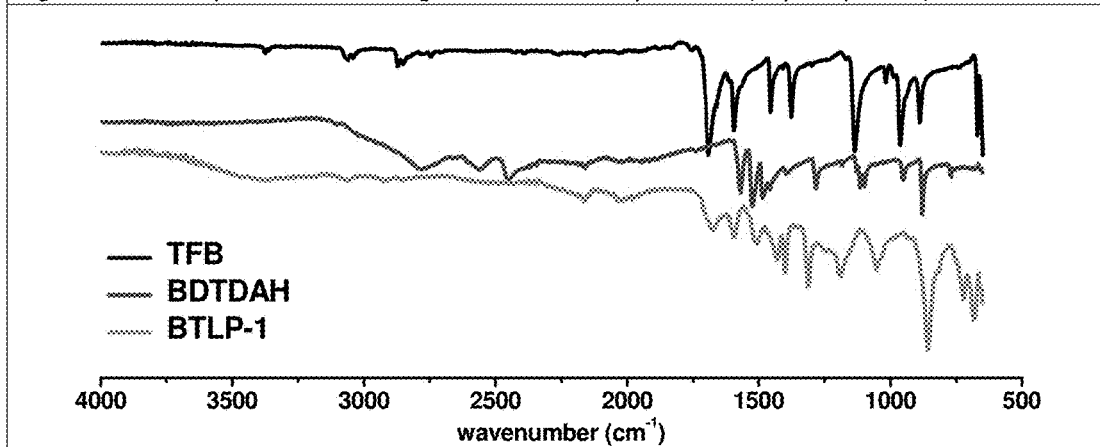
Figure 9: Infrared spectra of the starting materials and the synthesized polymer (BTLP-1) of FIG. 4.

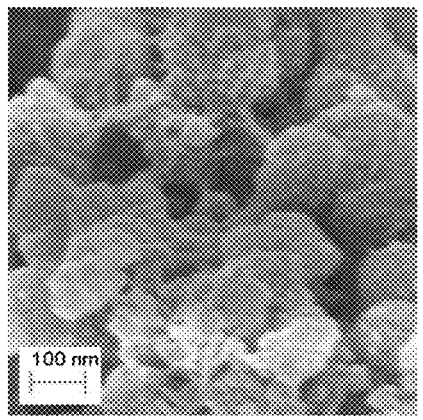
FIG. 10: Scanning Electron Microscopic (SEM) image of the polymer (PLP-1) of Fig. 1.
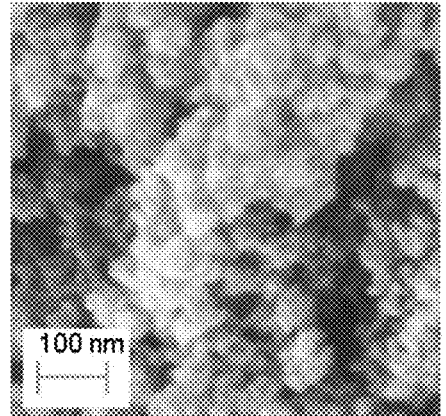
FIG. 11: Scanning Electron Microscopic (SEM) image of the polymer (GDP-1) of Fig. 2.
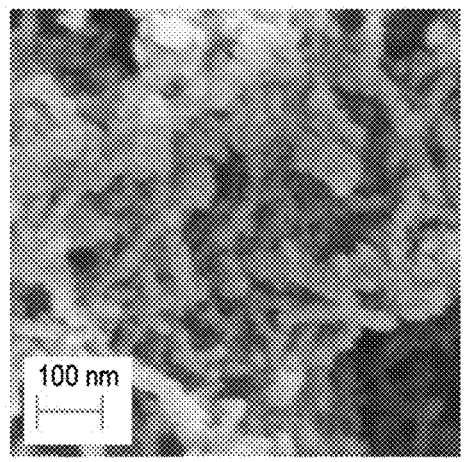
FIG. 12: Scanning Electron Microscopic (SEM) image of the polymer (BOLP-1) of Fig. 3.
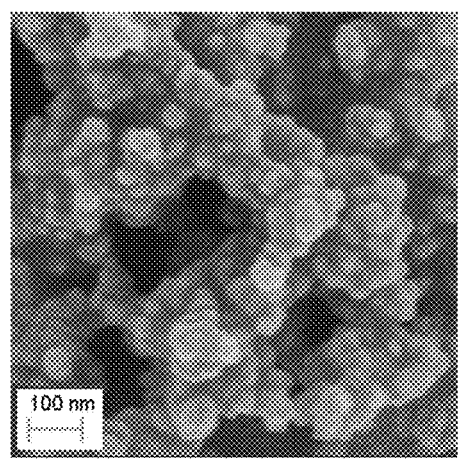
FIG. 13: Scanning Electron Microscopic (SEM) image of the polymer (BTLP-1) of Fig. 4.

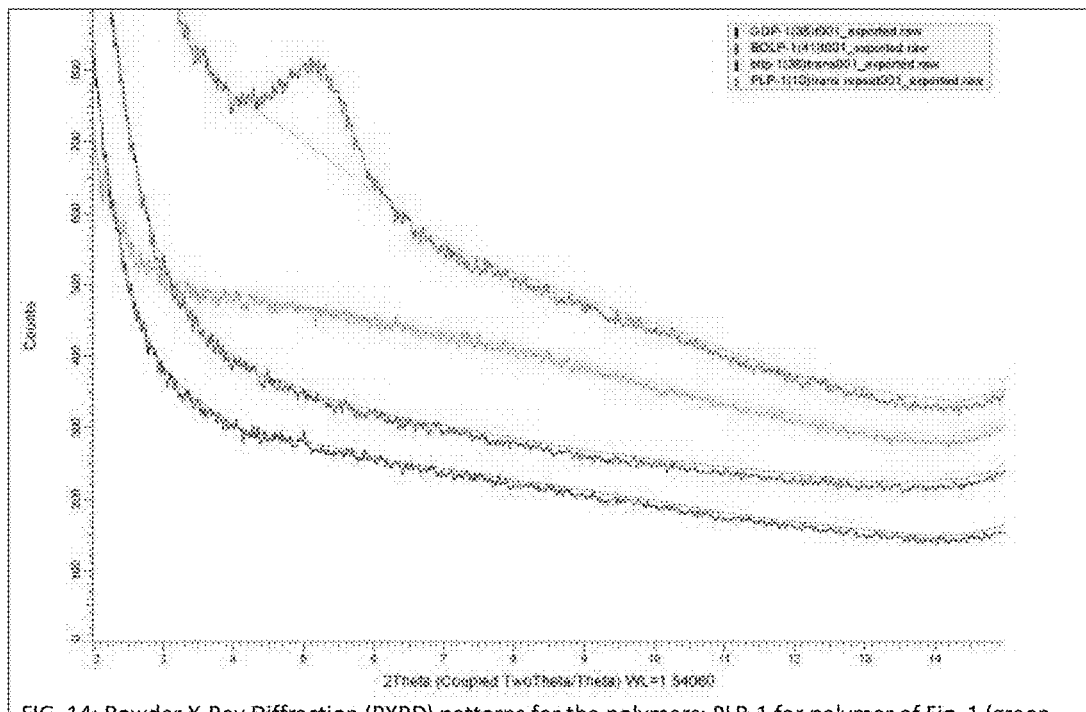
FIG. 14: Powder X-Ray Diffraction (PXRD) patterns for the polymers: PLP-1 for polymer of Fig. 1 (green trace), GDP-1 for polymer of Fig. 2 (black trace), BOLP-1 for polymer of Fig. 3 (red trace), and BTLP-1 for polymer of Fig. 4 (blue trace).
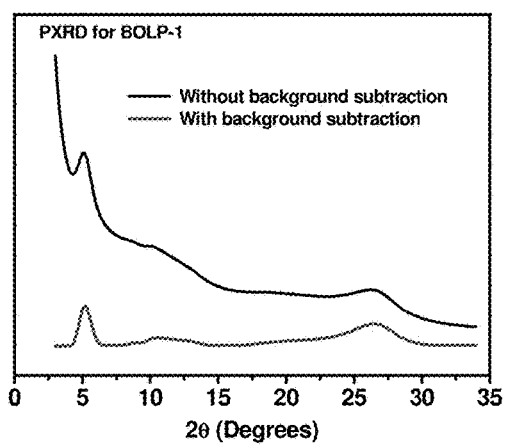
FIG. 15: Powder X-Ray Diffraction (PXRD) patterns for the polymer BOLP-1 of Fig. 3.

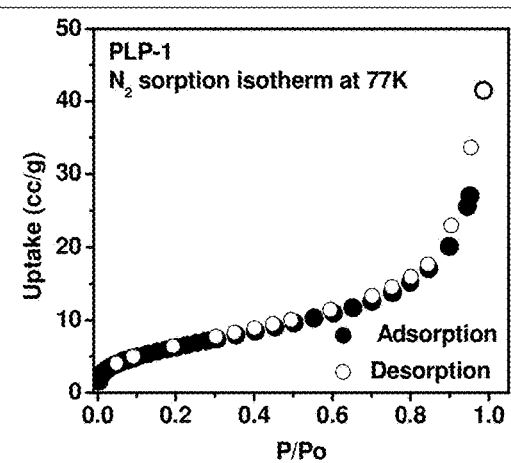
Figure 16: Isothermal adsorption/desorption of $N_2$ by the polymer (PLP-1) of FIG. 1 at 77K.
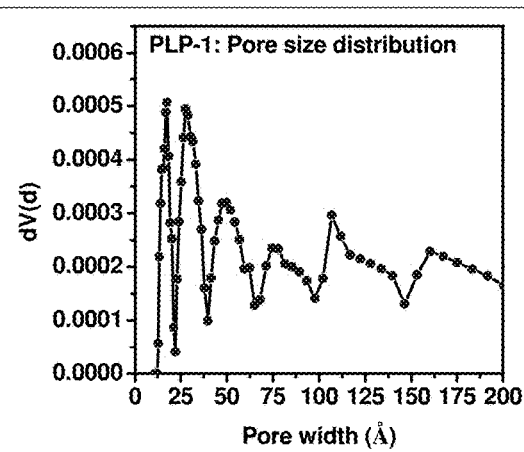
Figure 17: Pore size distribution (PSD) of the polymer (PLP-1) of FIG. 1 calculated from the $N_2$ sorption isotherm at 77K of FIG. 16
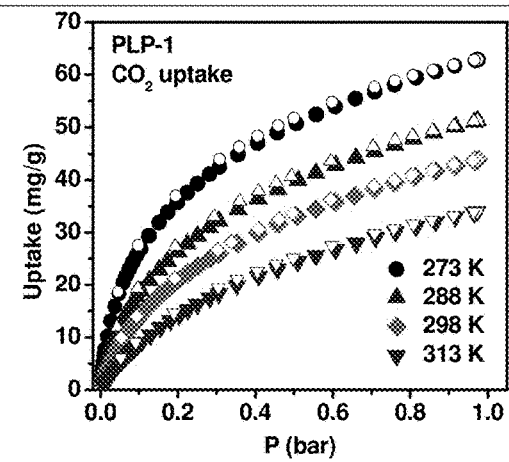
Figure 18: Isothermal adsorption of $CO_2$ by the polymer (PLP-1) of FIG. 1 at 273K, 288K, 298K and 313K.
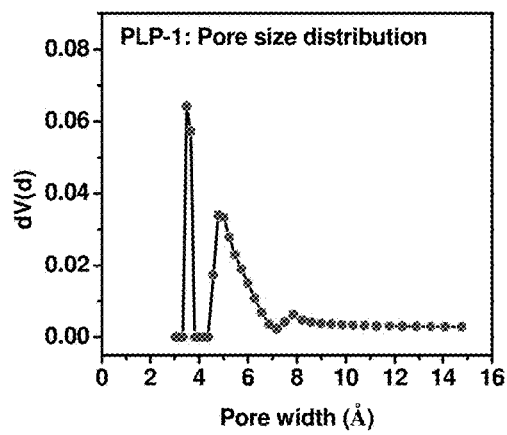
Figure 19: Pore size distribution (PSD) from the $CO_2$ sorption isotherm of the polymer (PLP-1) of FIG. 1 at 273K.

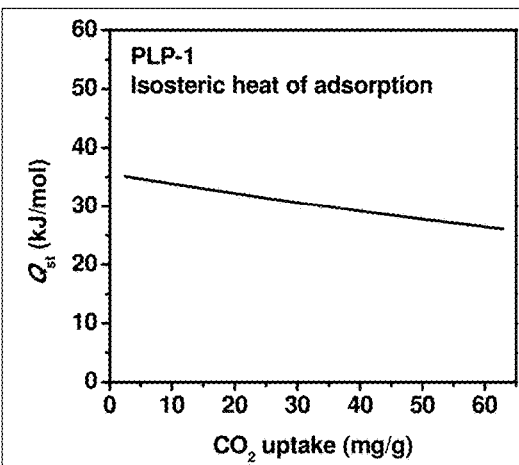
Figure 20: Isosteric heat of adsorption ($Q_{st}$) for $CO_2$ of the polymer (PLP-1) of FIG. 1.
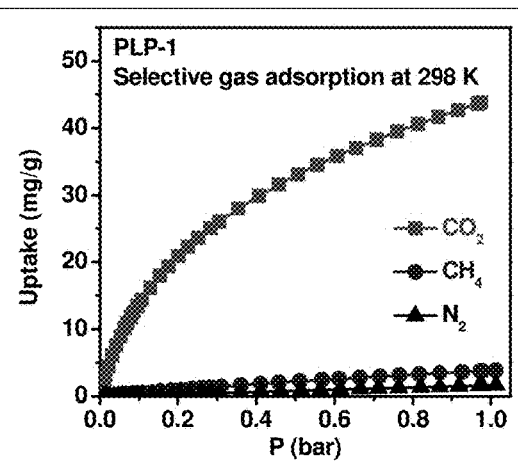
Figure 21: Selective adsorption of $N_2$, $CO_2$, and $CH_4$ of the polymer (PLP-1) of FIG. 1 at 298K.
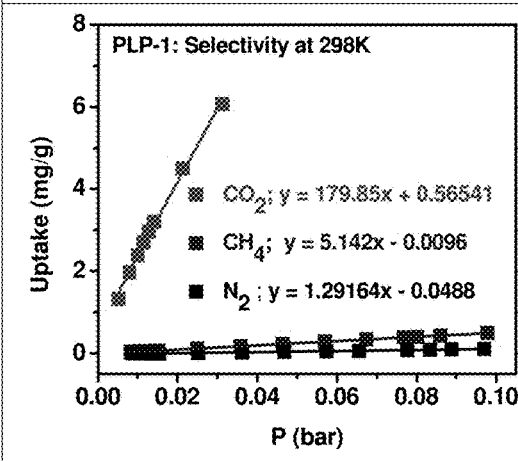
Figure 22: selectivity of $N_2$, $CO_2$, and $CH_4$ of the polymer (PLP-1) of FIG. 1 at 298K from initial slope method.
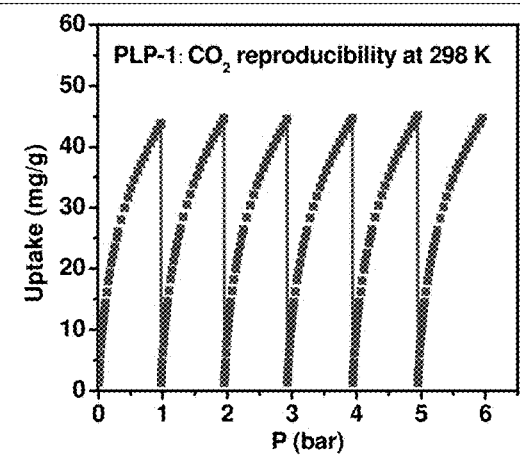
Figure 23: Adsorption of $CO_2$ over consecutive adsorption cycles of the polymer (PLP-1) of FIG. 1 at 298K.

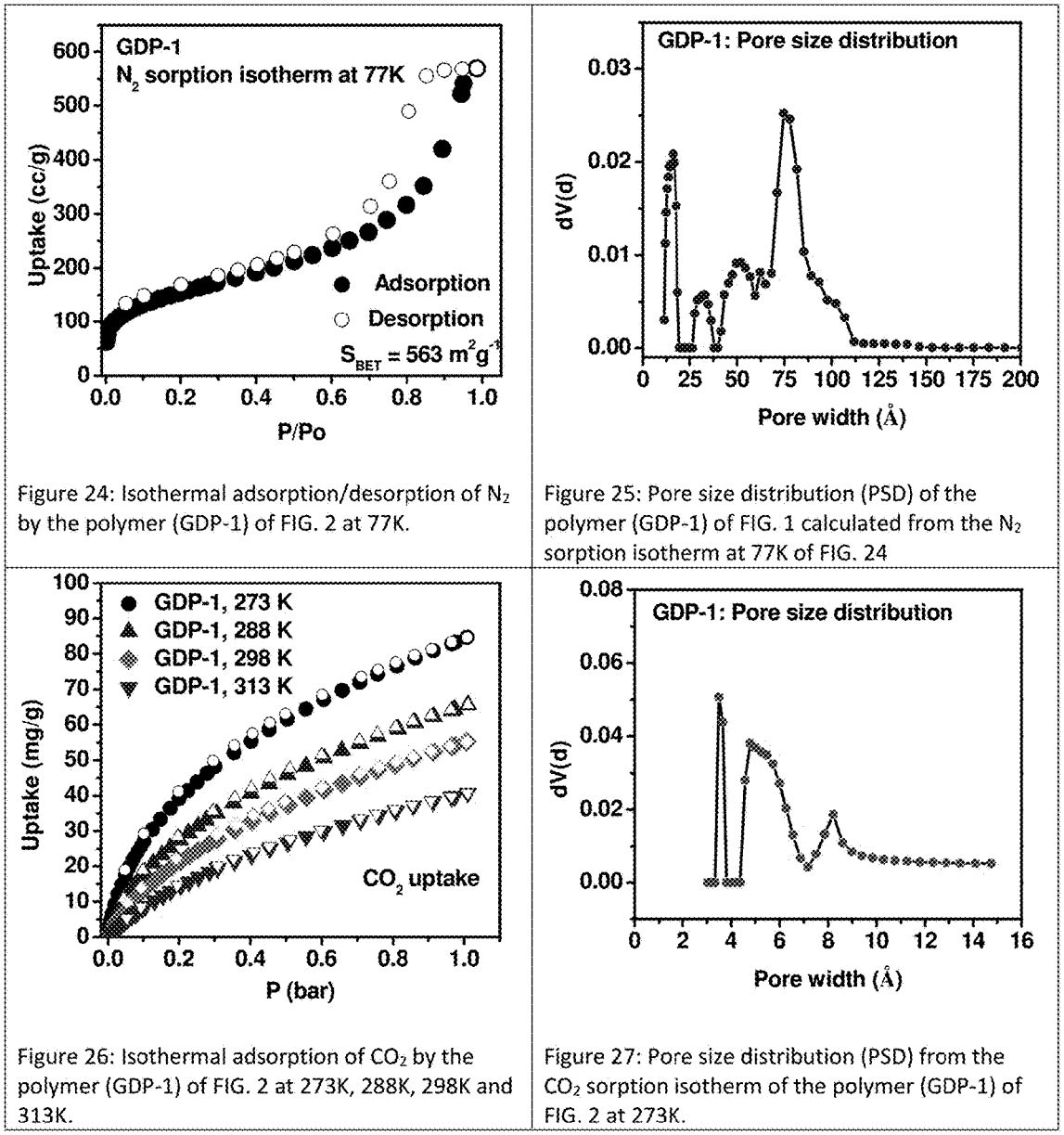
Figure 24: Isothermal adsorption/desorption of $N_2$ by the polymer (GDP-1) of FIG. 2 at 77K.
Figure 25: Pore size distribution (PSD) of the polymer (GDP-1) of FIG. 1 calculated from the $N_2$ sorption isotherm at 77K of FIG. 24
Figure 26: Isothermal adsorption of $CO_2$ by the polymer (GDP-1) of FIG. 2 at 273K, 288K, 298K and 313K.
Figure 27: Pore size distribution (PSD) from the $CO_2$ sorption isotherm of the polymer (GDP-1) of FIG. 2 at 273K.

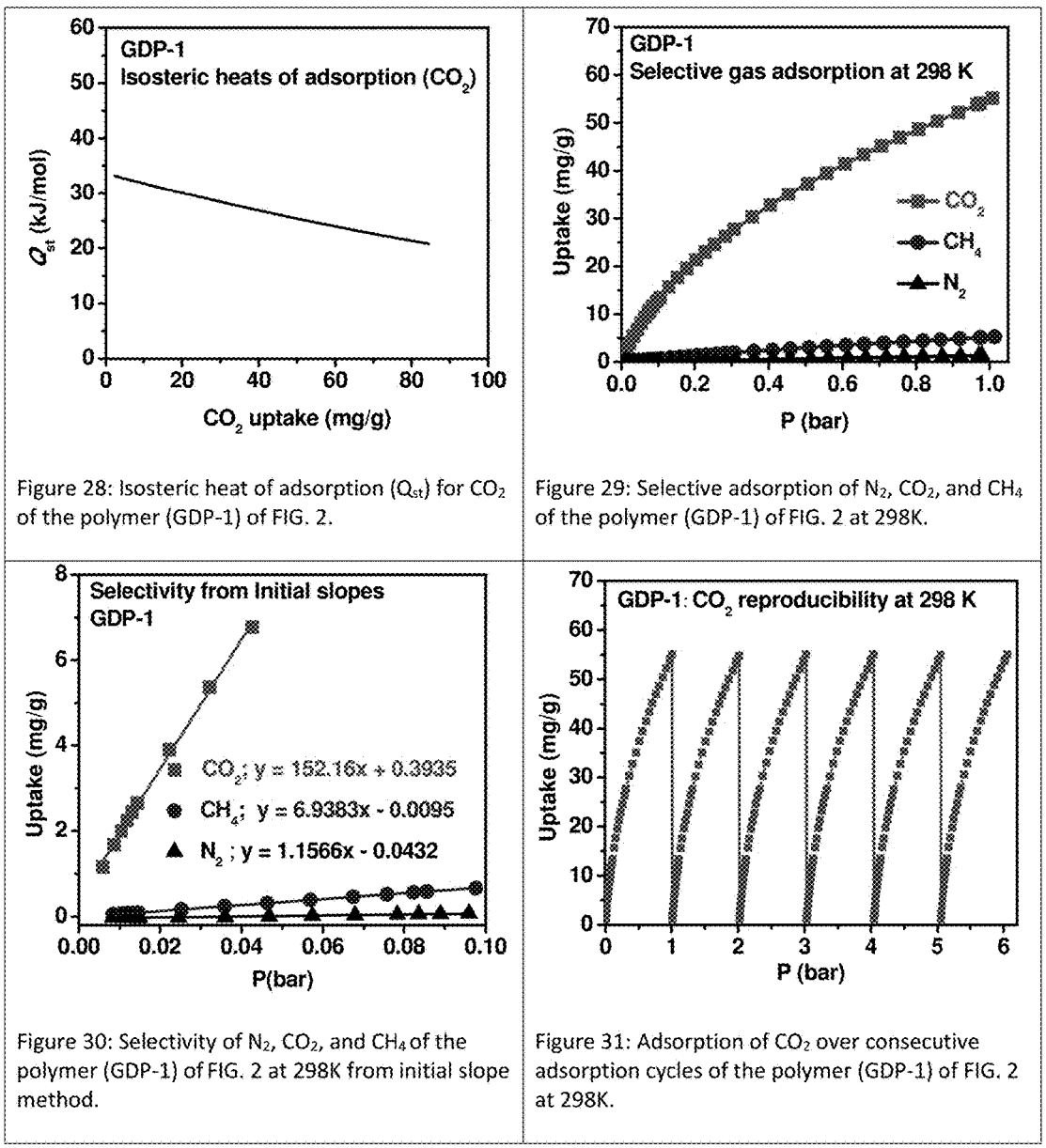
Figure 28: Isosteric heat of adsorption ($Q_{st}$) for $CO_2$ of the polymer (GDP-1) of FIG. 2.
Figure 29: Selective adsorption of $N_2$, $CO_2$, and $CH_4$ of the polymer (GDP-1) of FIG. 2 at 298K.
Figure 30: Selectivity of $N_2$, $CO_2$, and $CH_4$ of the polymer (GDP-1) of FIG. 2 at 298K from initial slope method.
Figure 31: Adsorption of $CO_2$ over consecutive adsorption cycles of the polymer (GDP-1) of FIG. 2 at 298K.

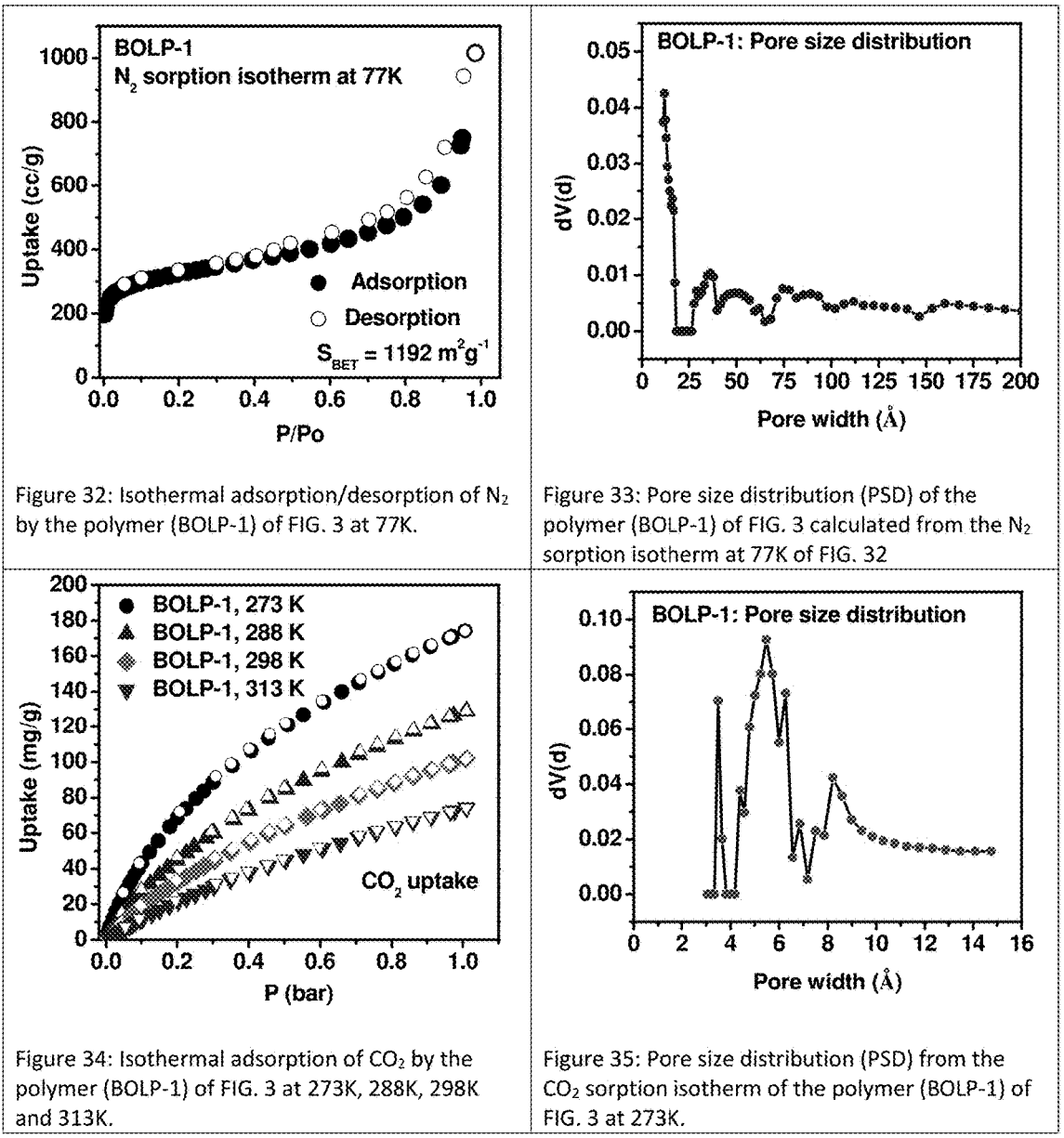

Figure 32: Isothermal adsorption/desorption of $N_2$ by the polymer (BOLP-1) of FIG. 3 at 77K.

Figure 33: Pore size distribution (PSD) of the polymer (BOLP-1) of FIG. 3 calculated from the $N_2$ sorption isotherm at 77K of FIG. 32

Figure 34: Isothermal adsorption of $CO_2$ by the polymer (BOLP-1) of FIG. 3 at 273K, 288K, 298K and 313K.

Figure 35: Pore size distribution (PSD) from the $CO_2$ sorption isotherm of the polymer (BOLP-1) of FIG. 3 at 273K.

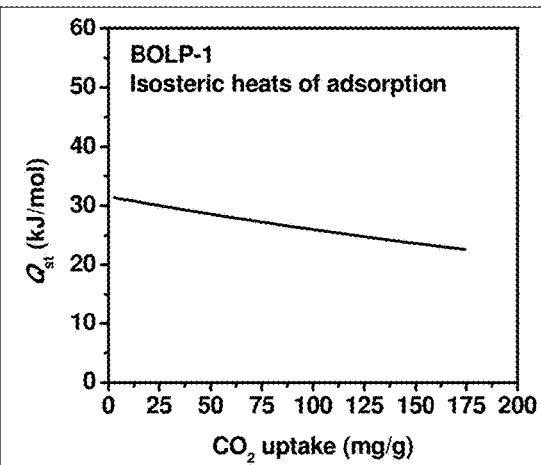
Figure 36: Isosteric heat of adsorption ($Q_{st}$) for $CO_2$ of the polymer (BOLP-1) of FIG. 3.
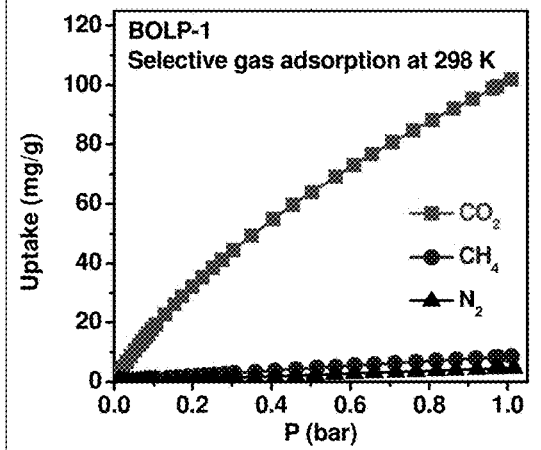
Figure 37: Selective adsorption of $N_2$, $CO_2$, and $CH_4$ of the polymer (BOLP-1) of FIG. 3 at 298K.
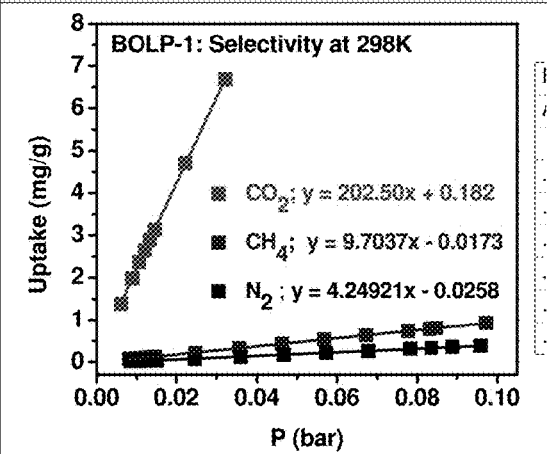
Figure 38: selectivity of $N_2$, $CO_2$, and $CH_4$ of the polymer (BOLP-1) of FIG. 3 at 298K from initial slope method.
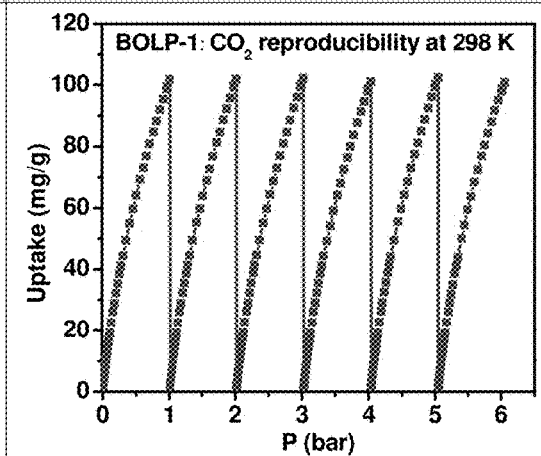
Figure 39: Adsorption of $CO_2$ over consecutive adsorption cycles of the polymer (BOLP-1) of FIG. 3 at 298K.

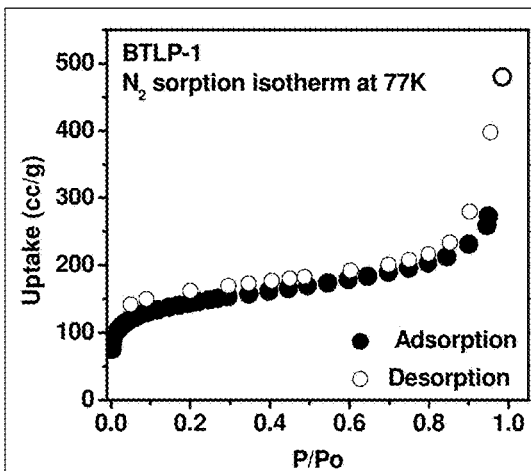

Figure 40: Isothermal adsorption/desorption of $N_2$ by the polymer (BTLP-1) of FIG. 4 at 77K.

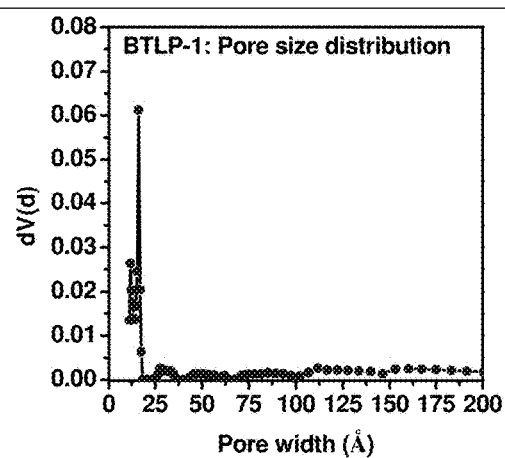

Figure 41: Pore size distribution (PSD) of the polymer (BTLP-1) of FIG. 4 calculated from the $N_2$ sorption isotherm at 77K of FIG. 40

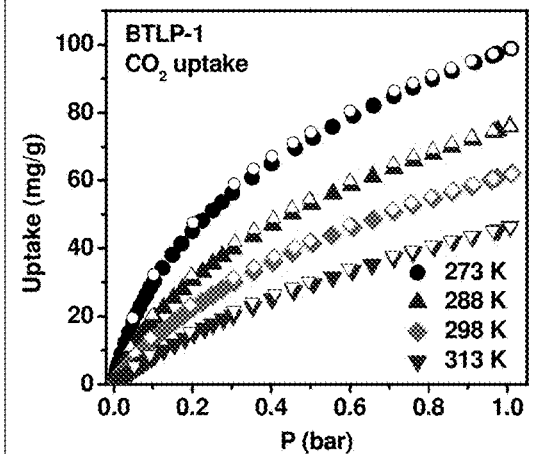

Figure 42: Isothermal adsorption of $CO_2$ by the polymer (BTLP-1) of FIG. 4 at 273K, 288K, 298K and 313K.

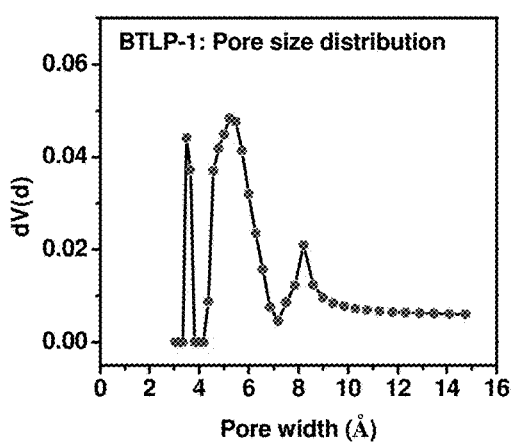

Figure 43: Pore size distribution (PSD) from the $CO_2$ sorption isotherm of the polymer (BTLP-1) of FIG. 4 at 273K.

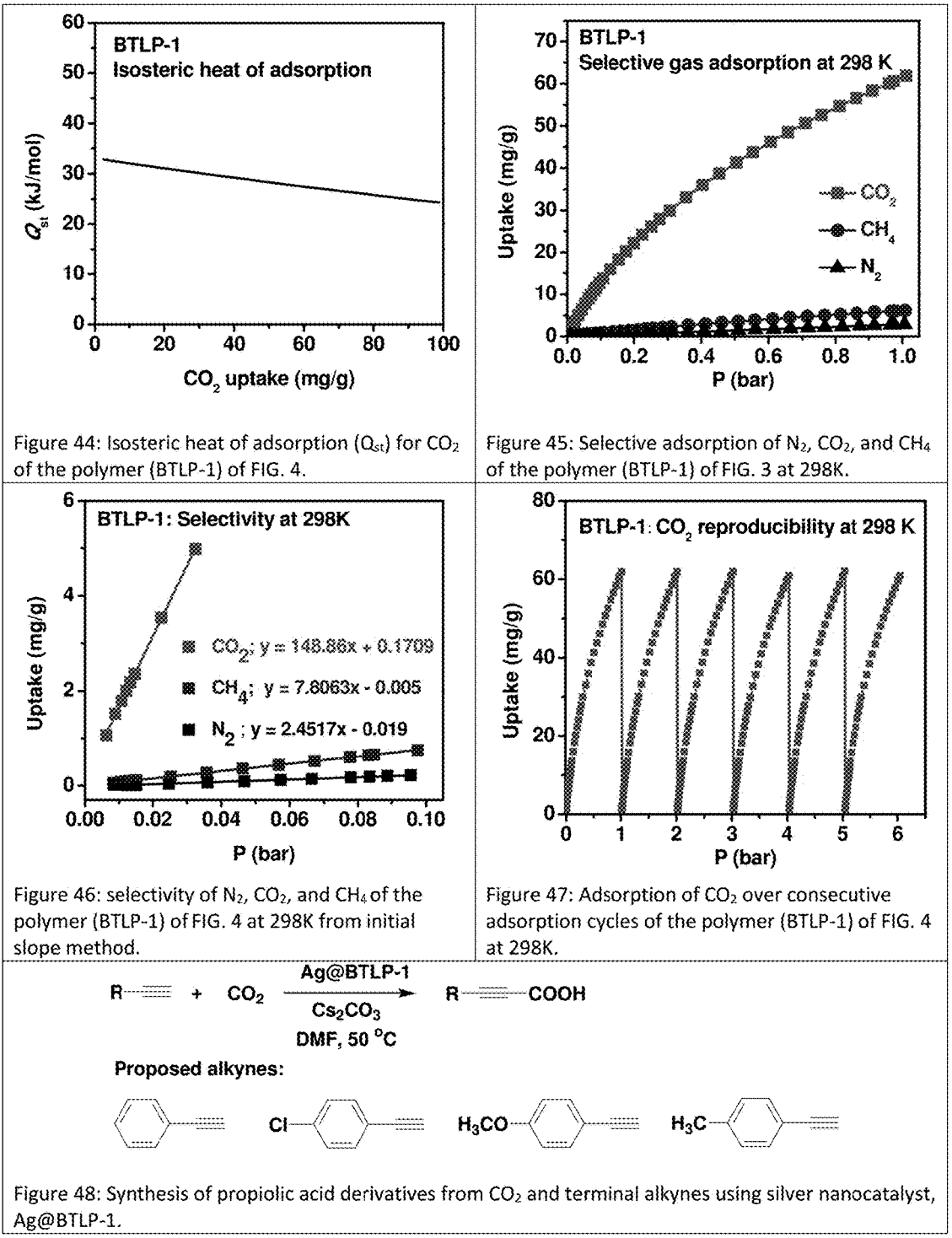

Figure 44: Isosteric heat of adsorption ($Q_{st}$) for $CO_2$ of the polymer (BTLP-1) of FIG. 4.

Figure 45: Selective adsorption of $N_2$, $CO_2$, and $CH_4$ of the polymer (BTLP-1) of FIG. 3 at 298K.

Figure 46: selectivity of $N_2$, $CO_2$, and $CH_4$ of the polymer (BTLP-1) of FIG. 4 at 298K from initial slope method.

Figure 47: Adsorption of $CO_2$ over consecutive adsorption cycles of the polymer (BTLP-1) of FIG. 4 at 298K.

Figure 48: Synthesis of propiolic acid derivatives from $CO_2$ and terminal alkynes using silver nanocatalyst, Ag@BTLP-1.

HETEROATOM RICH ORGANIC POLYMERS WITH ULTRA-SMALL PORE APERTURES FOR CARBON DIOXIDE SEPARATION AND/OR CONVERSION

CROSS-REFERENCE TO RELATED APPLICATIONS

This application claims priority from U.S. Provisional Patent Application Ser. No. 62/610,183, filed on Mar. 18, 2016, the entirety of which is expressly incorporated herein by reference for all purposes.

FIELD OF THE INVENTION

The present invention relates generally to porous organic polymers, and more specifically to heteroatom-rich porous organic polymers utilized in gas separation and in heterogeneous catalysts preparation.

BACKGROUND OF THE INVENTION

Energy production and use account for two-thirds of the world's greenhouse-gas (GHG) emissions, In 2013, $CO_2$ accounted for about 82% of all U, S, greenhouse gas emissions from human activities.[1] Separation and capture of $CO_2$, and its conversion to useful chemicals collectively is an important and promising way to address this urgent environmental challenge.

In 2010 the United States alone used 24.64 trillion cubic feet of natural gas. Such consumption of natural gas drives a worldwide market for new natural gas separation equipment of ~$5 billion per year.[2] In the production of natural gas, the natural gas or methane often has to be separated from other gases in order to enable the methane to be refined to a usable concentration or purity. Many different types of separation technologies are currently utilized to refine the methane from the other vases commonly produced along with methane, such as carbon dioxide.

For example, landfill gas, which is produced from municipal solid waste at landfills through microbial digestion, has been long-touted as a promising energy source. However, landfill gas is approximately 50% methane and 50% $CO_2$, and $CO_2$ removal from the methane remains a big hurdle to make this a potent, money-making energy source.

However, currently, amine scrubbers and cryogenic phase change processes are the most widely used technologies to separate $CO_2$ from methane/$CO_2$ gas mixtures. An amine scrubber uses asp alkanol amine solution in operation, which requires energy to regenerate the materials in the process and the amine solution is corrosive as well, rendering the material difficult to, handle.[3] Further, the cryogenic gas-to-liquid phase change is highly energy- and capital intensive.[4]

In addition, a microbial pathway of conversion of $CO_2$ to isoprene gas has recently been developed, with isoprene being a promising energy fuel.[5,6] However, the difficulty is how to separate the unreactive $CO_2$ from the target product, isoprene, after completion of the process.

Thus, it is highly desirable to develop a method and system for removing $CO_2$ from other gases, such as methane and isoprene, in a manner that does not require significant energy expenditure in order to more efficiently produce a useable gas stream(s) for energy production.

Recently, porous solid sorbents have emerged as promising materials to perform CO) capture and separation, heterogeneous catalysis, and sensing applications. In 2007, separation processes utilizing a membrane had less than 5% of this gas separation equipment market, almost all of which is applied toward the removal of carbon dioxide.[2] The US membrane industry alone was forecast to spend $5.4 billion in 2016 alone as membrane technology continues to compete against typical absorption processes.[7] However, current membrane separation technology, systems and processes are not capable of efficiently and reliably removing $CO_2$ from a combined gas stream in order to produce an acceptable gas stream for energy production.

SUMMARY OF THE INVENTION

Briefly described, according to an exemplary embodiment of the invention we claim here the discovery of a series of nitrogen rich porous organic polymers (NRPOPs) with a combination of sulfur or oxygen heteroatoms, which possess ultra-small pores within the frame apertures. In certain exemplary embodiments, their highly selective $CO_2$ adsorption properties make these polymers, promising candidates in making suitable gas separable membranes or heterogeneous catalysts.

In certain exemplary embodiments, chemically and thermally stable nitrogen-rich porous organic polymers (NRPOPs) and method of synthesis thereof are provided. The NRPOPs have ultra-small pore apertures and can be utilized in the formation of membranes for use in membrane-based gas separation technology.

According to another exemplary embodiment of the invention, the NRPOPs have nitrogen heterogeneity which provides an alkaline environment to the polymer and any membrane formed utilizing the polymer and can enhance the sorption of acidic gases, such as carbon dioxide ($CO_2$).

According to still another exemplary embodiment of the invention, a separation membrane system and process is provided utilizing NRPOPs for the separation of acidic $CO_2$ from an input gas stream to produce a purified gas stream that can function as a renewable energy fuel. The system and process of the invention can additionally reduce transportation costs as a result of the ease of implementation of the system and process, increasing the heat value of the output natural gas/methane gas stream thereby increasing the environmental benefits of the system and method. The membrane-based separation system and process, utilizes one of a number of nitrogen-rich porous organic polymers which contain ultra-small pores in their structures to form a simpler, easy to regenerate separation system and method that does not involve phase changes in the operation of the system.

According to another exemplary embodiment of the invention, functionalized nanoporous organic polymer(s) or NRPOP(s) are provided for use as: a) nanoporous membrane composite(s) for $CO_2$ gas separation and b) heterogeneous catalysts to convert $CO_2$ to useful chemicals. Because of the heteroatomic surface functionality in the NRPOPs, these polymers are also attractive in preparation of heterogeneous catalysts.

According to still another aspect of an exemplary embodiment of the invention, composition of matter includes a porous organic polymer having ultra-small pores defining apertures therein, wherein the structure of the polymer forming the pores is nitrogen-rich, sulfur-rich, oxygen-rich, or a combination thereof.

According to still another aspect of an exemplary embodiment of the invention, a method for removing carbon dioxide gas from an input gas stream includes the steps of providing a porous organic polymer having ultra-small pores defining apertures therein, wherein the structure of the polymer forming the pores is nitrogen-rich, sulfur-rich, oxygen-rich, or a combination thereof, passing the input gas stream through the composition and removing carbon dioxide gas molecules from the input gas stream.

According to still another aspect of an exemplary embodiment of the invention, a method for initiating a catalytic $CO_2$ conversion reaction includes the steps of providing a porous organic polymer, wherein the structure of the polymer forming the pores is nitrogen-rich, sulfur-rich, oxygen-rich, or a combination thereof, reacting the polymer composition with a transition metal to form a heterogeneous catalyst; and placing the heterogeneous catalyst in catalytic conversion reaction of $CO_2$ to useful chemicals.

Numerous other aspects, features, and advantages of the invention will be made apparent from the following detailed description.

BRIEF DESCRIPTION OF THE DRAWING FIGURES

The drawing figures illustrate the best mode currently contemplated of practicing the present invention.

In the drawings:

FIG. 1 is a scheme for the synthesis of a polymer according to one exemplary embodiment of the invention.

FIG. 2 is a scheme for the synthesis of a polymer according to another exemplary embodiment of the invention.

FIG. 3 is a scheme for the synthesis of a polymer according to third exemplary embodiment of the invention.

FIG. 4 is a scheme for the synthesis of a polymer according to fourth exemplary embodiment of the invention.

FIG. 5 is a graph of the Thermogravimetric analysis (TGA) traces of polymers of PLP-1 (FIG. 1), GDP-1 (FIG. 2), BOLP-1 (FIG. 3), and BTLP-1 (FIG. 4).

FIG. 6 is a graph of the infrared spectra of the starting materials and the synthesized polymer of FIG. 1.

FIG. 7 is a graph of the infrared spectra of the starting materials and the synthesized polymer of FIG. 2.

FIG. 8 is a graph of the infrared spectra of the starting materials and the synthesized polymer of FIG. 3.

FIG. 9 is a graph of the infrared spectra of the starting materials and the synthesized polymer of FIG. 4.

FIG. 10 is a graph of the Scanning Electron Microscopic (SEM) image of the polymer (PLP-1) of FIG. 1.

FIG. 11 is a graph of the Scanning Electron Microscopic (SEM) image of the polymer (GDP-1) of FIG. 2.

FIG. 12 is a graph of the FIG. 44: Scanning Electron Microscopic (SEM) image of the polymer (BOLP-1) of FIG. 3.

FIG. 13 is a graph of the FIG. 45: Scanning Electron Microscopic (SEM) image of the polymer BTLP-1) of FIG. 4.

FIG. 14 is a graph of the Powder X-Ray Diffraction (PXRD) patterns for the polymers: PLP-1 for polymer of FIG. 1 (green trace), GDP-1 for polymer of FIG. 2 (black trace). BOLP-1 for polymer of FIG. 3 (red trace), and BTLP-1 for polymer of FIG. 4 (blue trace).

FIG. 15 is a graph of the Powder X-Ray Diffraction (PXRD) patterns for the polymer BOLP-1 of FIG. 3.

FIG. 16 is a graph of the isothermal adsorption/desorption of $N_2$ by the polymer of FIG. 1 at 77K.

FIG. 17 is a graph of the pore size distribution (PSD) of the polymer of FIG. 1 calculated from the $N_2$ sorption isotherm at 77K of FIG. 16.

FIG. 18 is a graph of the isothermal adsorption of $CO_2$ by the polymer of FIG. 1 at 273K, 288K, 298K and 313K.

FIG. 19 is a graph of the pore size distribution (PSD) from the $CO_2$ sorption isotherm of the polymer of FIG. 1 at 273K.

FIG. 20 is a graph of the isosteric heat of adsorption ($Q_{st}$) for $CO_2$ of the polymer of FIG.

FIG. 21 is a graph of the selective adsorption of $N_2CO_2$, and $CH_4$ of the polymer of FIG. 1 at 298K.

FIG. 22 is a graph of the selectivity of $N_2$, $CO_2$, and $CH_4$ of the polymer of FIG. 1 at 298K.

FIG. 23 is a graph of the adsorption of $CO_2$ over consecutive adsorption cycles of the polymer of FIG. 1 at 298K.

FIG. 24 is a graph of the isothermal adsorption/desorption of $N_2$ by the polymer of FIG. 2 at 77K.

FIG. 25 is a graph of the pore size distribution (PSD) of the polymer of FIG. 2 calculated from the $N_2$ sorption isotherm at 77K of FIG. 24.

FIG. 26 is a graph of the isothermal adsorption of $CO_2$ by the polymer of FIG. 2 at 273K, 288K, 298K and 313K.

FIG. 27 is a graph of the pore size distribution (PSD) from the $CO_2$ sorption isotherm of the polymer of FIG. 2 at 273K.

FIG. 28 is a graph of the isosteric heat of adsorption ($Q_{st}$) for $CO_2$ of the polymer of FIG. 2.

FIG. 29 is a graph of the selective adsorption of $N_2$, $CO_2$, and $CH_4$ of the polymer of FIG. 2 at 298K.

FIG. 30 is a graph of the selectivity of $N_2$, $CO_2$, and $CH_4$ of the polymer of FIG. 2 at 298K.

FIG. 31 is a graph of the adsorption of $CO_2$ over consecutive adsorption cycles of the polymer of FIG. 2 at 298K.

FIG. 32 is a graph of the isothermal adsorption/desorption of $N_2$ by the polymer of FIG. 3 at 77K.

FIG. 33 is a graph of the pore, size distribution (PSD) of the polymer of FIG. 3 calculated from the $N_2$ sorption isotherm at 77K of FIG. 32.

FIG. 34 is a graph of the isothermal adsorption of $CO_2$ by the polymer of FIG. 3 at 273K, 288K, 298K and 313K.

FIG. 35 is a graph of the pore size distribution (PSD) from the $CO_2$ sorption isotherm of the polymer of FIG. 3 at 273K.

FIG. 36 is a graph of the isosteric heat of adsorption ($Q_{st}$) for $CO_2$ of the polymer of FIG. 3.

FIG. 37 is a graph of the selective adsorption of $N_2$, $CO_2$, and $CH_4$ of the polymer of FIG. 3 at 298K.

FIG. 38 is a graph of the selectivity of $N_2$, $CO_2$, and $CH_4$ of the polymer of FIG. 3 at 298K.

FIG. 39 is a graph of the adsorption of $CO_2$ over consecutive adsorption cycles of the polymer of FIG. 3 at 298K.

FIG. 40 is a graph of the isothermal adsorption desorption of $N_2$ by the polymer of FIG. 4 at 77K.

FIG. 41 is a graph of the pore size distribution (PSD) of the polymer of FIG. 4 calculated from the $N_2$ sorption isotherm at 77K of FIG. 40.

FIG. 42 is a graph of the isothermal adsorption of $CO_2$ by the polymer of FIG. 4 at 273K, 288K, 298K and 313K.

FIG. 43 is a graph of the pore size, distribution (PSI)) from the $CO_2$ sorption isotherm of the polymer of FIG. 4 at 273K.

FIG. 44 is a graph of the isosteric heat of adsorption ($Q_{st}$) for $CO_2$ of the polymer of FIG. 4.

FIG. 45 is a graph of the selective adsorption of $N_2$, $CO_2$, and $CH_4$ of the polymer of FIG. 4 at 298K.

FIG. 46 is a graph of the selectivity of $N_2$, $CO_2$, and $CH_4$ of the polymer of FIG. 4 at 298K.

FIG. 47 is a graph of the adsorption of $CO_2$ over consecutive adsorption cycles of the polymer of FIG. 4 at 298K.

FIG. 48 is a reaction scheme showing the catalytic conversion of $CO_2$ to propiolic acid derivatives using the silver nanocatalyst Ag@BTLP-1.

DETAILED DESCRIPTION OF THE INVENTION

Reference will now be made in detail to various embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Development of solid sorbents to separate gas molecules, and in one embodiment to separate carbon dioxide from methane and nitrogen, has recently attracted considerable interest in an effort to treat pre-combustion or post-combustion gases, for example, natural gas, landfill gas or flue gas. In certain exemplary embodiments of the invention, heteroatom (N,S,O)-rich porous organic polymers (POPs) which contain ultra-small pores (subnanometer size) in their structures have been developed for this purpose. Four different types of polymers were synthesized with varying heteroatoms (C, N, O and S) in their structures.

In one exemplary embodiment, nitrogen-rich phenazine-linked polymers (PLPs) were synthesized by condensation reaction between ortho-diamine and ortho-diketone (FIG. 1). In another exemplary embodiment, glyoxal-derived polymers (GDPs) were synthesized by the reaction between amine functionalized monomers and glyoxal (FIG. 2). In third exemplary embodiment, benzoxazole-linked polymers (BOLPs) that are both nitrogen- and oxygen-rich, were synthesized by condensation reaction between ortho-aminophenol and aldehyde (FIG. 3). In fourth exemplary embodiment, benzothiazole-linked polymers (BTLPs) that are both nitrogen- and sulfur-rich, were synthesized by condensation reaction between ortho-aminothiol and aldehyde (FIG. 4). Each of the synthesized polymers are chemically and thermally stable. Significantly smaller pores with a pore size distribution of around 0.5 nm were allowed to form using high cross-linking among the building units throughout the polymerization process for each polymer. The presence of nitrogen heterogeneity in the pore apertures provides the basicity or alkaline nature to the frames/polymers, enhancing the ability of the pores to attract and retain acidic $CO_2$ gas molecules. The polymers showed exceptionally high carbon dioxide ($CO_2$) capture ability over methane ($CH_4$) and nitrogen ($N_2$) with maximum selectivity of 35 and 140, respectively, at 25° C. Significantly smaller pores and basic nitrogen centers present in the pores both favor the adsorption of relatively smaller and acidic carbon dioxide ($CO_2$) gas molecules (kinetic diameter of 0.33 nm) compared to relatively larger diatomic nitrogen ($N_2$) gas (kinetic diameter of 0.36 nm) or methane ($CH_4$) gas (kinetic diameter of 0.38 am) molecules. Smaller pores and the presence of high basic-nitrogen centers in pore apertures make these polymers an ideal candidate to separate acidic carbon dioxide ($CO_2$) gas from varieties of gas mixtures, for examples, natural gas, landfill gas, biogas, flue gas etc., among others.

EXPERIMENTAL SECTION

General Techniques, Materials, and Methods.

All chemicals were purchased from commercial suppliers (Sigma-Aldrich, Acros Organics, and Frontier Scientific) and used without further purification, unless otherwise noted. Air-sensitive samples and reactions were handled under an inert atmosphere of nitrogen using either glovebox or Schlenk line techniques. FT-IR spectra were obtained using Attenuated Total Reflectance sampling on PerkinElmer FT-IR spectrometer. Sorption experiments were collected using a NOVA-1000 series analyzer using adsorbates of UHP grade. In a typical experiment on a polymer sample, the sample was loaded into a 9 mm large bulb cell of known weight and then hooked up to NOVA series analyzer and degassed at 120° C. for 12 h. The degassed sample was refilled with nitrogen, weighed precisely and then transferred back to the analyzer. The temperatures for adsorption measurements were controlled by using refrigerated bath of liquid nitrogen (77 K), or a temperature controlled water bath (273K, 288K, 298K and 313K). Carbon dioxide ($CO_2$) and methane ($CH_4$) isotherms were collected at 273, 288, 298 and 313K. Nitrogen ($N_2$) isotherms were collected at 77, 273, 298 and 313K. Pore Size Distribution (PSD) was calculated using NLDFT model (on carbon). PSD mesoporous (2 nm to 50 nm) and microporous (less than 2 nm) regions were calculated from nitrogen ($N_2$) isotherm collected at 77 K, while the PSD in ultra-micropore (0.35-1.5 nm) region was estimated from carbon dioxide ($CO_2$) isotherm collected at 273K.

Synthesis of PLP-1. A 100 mL Schlenk flask was charged with stoichiometric amount of hexaketocyclohexane and 3,3'-diaminobenzidine and refluxed in acetic acid for 3 days to form the polymer according to the reaction scheme in FIG. 1. A brown color solid, product was filtered, washed with water and then ethanol, and finally dried under vacuum at 150° C. overnight. A light brown colored solid product was obtained in high yield (85%) with the following exemplary composition:

PLP-1 ($C_{48}H_{18}N_{12}.5H_2O$): Calcd. C, 67.60%; H, 3.31%; N, 19.71%.

Found: C, 67.52%; H, 3.03%; N, 18.35%.

Synthesis of GDP-1. A 100 mL Schlenk flask was charged with stoichiometric amount of melamine and glyoxal, and refluxed in DMSO for 3 days to form the polymer according to the reaction scheme in FIG. 2. The dark colored solid product was filtered, washed with tetrahydrofuran and finally dried at 150° C. under vacuum overnight. A dark colored solid product was obtained in high yield (90%) with the following exemplary composition:

GDP-1 ($C_{12}H_6N_{12}.C_4H_{12}O_2S_2$): Calcd. C, 40.50%; H, 3.82%; N, 35.42%.

Found: C, 42.94%; H, 3.05%; N, 33.66%.

Synthesis of BOLP-1. A 100 mL Schlenk flask was charged with stoichiometric amount of amine 1, 4-Benzenediol, 2,5-diamino-, hydrochloride (BDODAH) and 1,3,5-Triformylbenzene (TFB), and refluxed in anhydrous DMF for 3 days to form the polymer according to the reaction scheme in FIG. 3. The solid product was filtered, washed with tetrahydrofuran and finally dried at 150° C. under vacuum overnight. A light brown colored solid product was obtained in high yield (91%) with the following exemplary composition:

BOLP-1 ($C_{36}H_{12}N_6O_6.2H_2O$): Calcd. C, 65.46%; H, 2.44%; N, 12.72%; O, 19.38%.

Found: C, 65.06%; H, 4.01%; N, 11.74% O, 19.13%.

Synthesis of BTLP-1. A 100 Schlenk flask was charged with stoichiometric amount of amine 1, 4-Benzenedithiol, 2,5-diamino-, hydrochloride (BDTDAH) and 1,3,5-Triformylbenzene (TFB), and refluxed in anhydrous DMF for 3 days to form the polymer according to the reaction scheme in FIG. 4. The solid product was filtered, washed with tetrahydrofuran and finally dried at 150° C. under vacuum overnight. A light yellow colored solid product was obtained in high yield (92%) with the following exemplary composition:

BTLP-1 ($C_{36}H_{12}N_6.5H_2O$): Calcd. C, 57.12%; H, 2.13%; N, 11.10%; S, 25.42%.

Found: C, 57.78%; H, 2.83%; N, 10.91% S, 20.72%.

Results and Discussion

Phenazine-linked polymer (PLP-1), glyoxal-derived polymer (GDP-1), benzoxazole-linked polymer (BOLP-1), and benzothiazole-linked polymer (BTLP-1) were synthesized by the exemplary embodiments for the polycondensation reactions as shown in FIGS. 1, 2, 3 and 4, respectively. The synthesized polymers are stable in 2M HCl, 2M NaOH and in all common organic solvents which indicates the chemical stability of the respective polymers. They are each activated up to 150° C., which indicates the thermal stability. Further, as shown in FIG. 5, as confirmed by thermogravimetric analysis (TGA), each NRPOP is very stable up to 600° C. except GDP-1 which is stable up to 300° C. The weight loss after 200° C. in GDP-1 is due to the loss of residual dimethyl sulfoxide (DMSO) solvent.

The chemical connectivity within the polymers was investigated by FT-IR spectroscopic technique. Spectra were measured for the starting monomers and are depicted along with the spectra for PLP-1 in FIG. 6. The formation of phenazine ring in PLP-1 was supported by the appearance of characteristic C=N and C—N stretching bands at 1615 $cm^{-1}$ and 1358 $cm^{-1}$, respectively. The N—H stretching bands at around 3200-3400 $cm^{-1}$ in amine monomer (top spectrum) were completely disappeared upon polymerization which confirmed the full consumption of amine in phenazine ring formation. A significant depletion was observed in the intensity of a peak located at 1670 $cm^{-1}$ which corresponds to the carbonyl group of hexaketone monomer. The weak shoulder at 1660 cm' is presumably due to the residual C=O groups in PLP-1.

FT-IR spectra for GDP-1 and the starting monomer melamine are depicted in FIG. 7. The IR peaks for $NH_2$ stretching are significantly reduced upon polymerization. The absence of a carbonyl peak at around 1700 $cm^{-1}$ indicates the full consumption of glyoxal. The presence of peaks at 1620, 1535 and 1435 $cm^{-1}$ which overlay the peaks observed in melamine spectrum are assigned to C—N stretchings for the melamine ring.

FT-IR spectra for BOLP-1 and the starting monomers are depicted in FIG. 8. The IR peaks for $NH_2$ stretchings (protonated form in HCl salt observed at around 3,000 $cm^{-1}$) disappeared upon polymerization. The trace of 1700 $cm^{-1}$ peak in BOLP-1 indicates the presence of residual terminal aldehyde groups. The peak at around 1627 $cm^{-1}$ is assigned to characteristic stretches of a benzoxazole ring. A new band appears at around 848 $cm^{-1}$ which is assigned to C—O—C stretching bands.

FT-IR spectra for BTLP-1 and the starting monomers are depicted in FIG. 9. Similar to BOLP-1, the IR peaks for protonated $NH_2$ stretching in BTLP-1 disappeared upon polymerization. The trace of around 1700 $cm^{-1}$ peak in BTLP-1 indicates the presence of residual terminal aldehyde groups. The characteristic C=N stretching of benzothiazole ring was observed at lower frequency at around 1595 $cm^{-1}$ compared to that in BOLP-1. Similarly, the C—S—C stretching band in BTLP-1 was also observed at lower frequency at 725 $cm^{-1}$ compared to that of C—O—C in BOLP-1.

Physical, morphology of the polymer was studied via Scanning Electron Microscopic (SEM) images (FIGS. 10-13). In the case of PLP-1, GDP-1, and BTLP-1 aggregation of spherical particles were observed. On the other hand in BOLP-1, smaller spherical particles show fiber-like aggregation.

Powder X-ray diffraction analysis was performed to understand the crystallinity of the polymers (FIGS. 14 and 15). Polymers PLP-1, GDP-1, and BTLP-1 are amorphous as evidenced by absence of any XRD peaks. On the other hand, BOLP-1 is crystalline.

Gas Adsorption Properties

The porous nature of the synthesized polymers was studied by nitrogen sorption-desorption isotherms collected at 77 K. FIG. 16 shows the $N_2$ adsorption isotherm for PLP-1, as synthesized in a first exemplary embodiment according to FIG. 1. This is a type H isotherm which suggests the strong adsorbate-adsorbent interactions. Initial sharp uptake suggests the microporous nature of the PLP-1 polymer. The pore size distribution (PSD) was calculated from $N_2$ isotherms which reflected very small percentage of mesoporosity (higher than 2 nm) and higher percentage of microporosity (less than 2 nm) as shown, in FIG. 17. The Brunauer-Emmett-Teller (BET) surface area calculation resulted in a value of 24 $m^2g^{-1}$. This significantly low surface area suggested one of the two following possibilities: i) the polymer is just nonporous; or ii) the polymer is porous with a pore diameter significantly small to prevent penetration of nitrogen ($N_2$) gas molecules. In order to confirm the second possibility, adsorption isotherms were measured using carbon dioxide ($CO_2$) as an adsorbate gas molecule which has smaller kinetic diameter (0.33 am) compared to nitrogen ($N_2$) (036 nm). Surprisingly, PLP-1 absorbs significantly high levels of $CO_2$ and these carbon dioxide ($CO_2$) adsorption isotherms were collected at 273, 288, 298 and 313 K and are shown in FIG. 18. High $CO_2$ adsorption indicates the presence of ultra-small pores in the frames which are large enough for smaller $CO_2$ gas molecules to enter but not large enough for slightly larger $N_2$ gas molecules.

The carbon dioxide ($CO_2$) isotherm at 273K from FIG. 18 was fitted by the nonlocal density functional theory (NLDFT) model to calculate pore size distribution (PSD) in ultra-micropore areas for PLP-1, as shown in FIG. 19. The dominant PSD of PLP-1 was found to be centered on around 0.35 am and 0.5 nm. Although the kinetic diameter of nitrogen ($N_2$) gas molecules (0.36 nm) apparently falls within the average PSD of PLP-1, the narrower PSD would probably block the nitrogen ($N_2$) gas molecules from passing freely through the pores. In addition to the ultra-small pores, the presence of basic-nitrogen centers in the pore apertures as shown in the structure of PLP-1 in FIG. 1 is expected to facilitate the adsorption of the acidic and relatively smaller carbon dioxide ($CO_2$) gas molecules onto the polymer PLP-1.

In order to understand the effect of the nitrogen heterogeneity in porous frames and the ultra-small pore size distribution in selective gas adsorption capacity, a series of polymers were synthesized varying the frame heteroatoms and the building units. Melamine is an economically cheap and fascinating building unit which provides high content of nitrogen through amine functional groups. Glyoxal which is the shortest aldehyde monomer among the dialdehyde series was reacted with melamine in a second exemplary embodiment to synthesize glyoxal-derived polymer (GDP-1) according to the scheme in FIG. 2. The nitrogen ($N_2$) adsorption isotherm at 77K shown in FIG. 24 is a type IV isotherm which indicates the presence of significant mesopores and the strong adsorbate-adsorbent interactions. The Brunauer-Emmett-Teller (BET) surface area calculation from nitrogen ($N_2$) sorption isotherms resulted in value of 563 $m^2g^{-1}$. The significantly higher surface areas for GDP-1 compared to PLP-1 are presumably due to the presence of the melamine building unit which reduces the interpenetration during cross-linking. The pore size distribution (PSD) in mesopore area for GDP-1 was calculated using nonlocal density functional theory (NLDFT) model from the nitrogen ($N_2$) sorption isotherm at 77K and resulted in a wide distribution, as shown in FIG. 25. The mesopore distribution in GDP-1 is more than 40 times higher than PLP-1, as shown by FIGS. 17 and 25. In order to compare the PSD in ultra-micropore region with that found for PLP-1, we calculated PSD from a $CO_2$ sorption isotherm for GDP-1. These isotherms were measured at different temperatures (273K, 288K, 298K, 313K) and are shown in FIG. 26. The carbon dioxide ($CO_2$) isotherm measured at 273 K was fitted by nonlocal density functional theory (NLDFT) model and the distributions are shown in FIG. 27. The ultra-micropore distribution is comparable to PLP-1, as shown by FIGS. 19 and 27.

In third exemplary embodiment, a benzoxazole-linked polymer (BOLP-1) was synthesized, which provides oxygen heterogeneity in the frame along with the nitrogen atoms, as shown by the FIG. 3. In order to evaluate the porosity in BOLP-1, sorption isotherms were measured. The initial sharp uptake and the type II nitrogen ($N_2$) adsorption isotherm at 77K shown in FIG. 32 suggest the presence of microporosity (pore diameter of less than 2 nm) and the strong adsorbate-adsorbent interactions. The Brunauer-Emmett-Teller (BET) surface area calculation from nitrogen ($N_2$) sorption isotherms resulted in value of 1215 $m^2g^{-1}$. The pore size distribution (PSD) calculated using nonlocal density functional theory (NLDFT) model from the nitrogen ($N_2$) sorption isotherm at 77K showed significantly lower mesopore distribution compared to GDP-1, as shown by FIGS. 25 and 33. In order to compare the PSD in ultra-micropore region, we calculated PSD from a $CO_2$ sorption, isotherm for BOLD-1. These isotherms were measured at different temperatures (273K, 288K, 298K, 313K) and are shown in FIG. 34. The carbon dioxide ($CO_2$) isotherm measured at 273 K was fitted by nonlocal density functional theory (NLDFT) model and the distributions are shown in FIG. 35. The ultra-micropore distribution dominated at around 0.4-0.6 nm is almost double compared to GDP-1. This suggests the formation of high percentage of micropores its BOLP-1.

Having significantly improved surface areas and higher micropore distribution, we attempted to synthesize an analogue of BOLP-1 using thiazole linker instead of oxazole linker. Benzothiazole-linked polymer (BTLP-1) provides sulfur heterogeneity in the frame instead of oxygen along with the nitrogen atoms, as shown by the FIG. 4. In order to evaluate the porosity in BTLP-1, sorption isotherms were measured. The initial sharp uptake and the type II nitrogen ($N_2$) adsorption isotherm at 77K shown in FIG. 40 suggest the presence of microporosity and the strong adsorbate-adsorbent interactions. The Brunauer-Emmett-Teller (BET) surface area calculation from nitrogen ($N_2$) sorption isotherms resulted in value of 540 $m^2g^{-1}$. The pore size distribution (PSD) calculated using nonlocal density functional theory (NLDFT) model from the nitrogen ($N_2$) sorption isotherm at 77K showed dominant micropore distribution and significantly lower mesopore distribution as shown by FIG. 41. In order to compare the PSI) in ultra-micropore region, we calculated PSD from a $CO_2$ sorption isotherm for BTLP-1. These isotherms were measured at different temperatures (273K, 288K, 298K, 313K) and are shown in FIG. 42. The carbon dioxide ($CO_2$) isotherm measured at 273 K was fitted by nonlocal density functional theory (NLDFT) model and the distributions are shown in FIG. 43. The ultra-micropore distribution dominated at around 0.4-0.6 nm is similar to that of GDP-1 but less than that of BOLP-1 (almost half). This is because the crystalline nature in BOLP-1 increases the number of pores accessible for gas molecules, while in noncrystalline polymers large number of significantly, smaller pores are available which are not accessible for gas molecules.

Although the synthesized polymers have a significant nitrogen atom constituency, significant differences in surface areas and PSD are expected to play important roles in gas uptake properties. Looking at Table 1, PLP-1, GDP-1, BOLP-1 and BTLP-1 possess carbon dioxide ($CO_2$) adsorption to 63, 85, 175 and 99 $mgg^{-1}$, respectively, at 273 K and 1 bar. Highest $CO_2$ uptake for BOLP-1 is consistent with its highest surface area and is in the top list of reported porous organic polymers. Surprisingly, PLP-1 which possesses surface area of only 24 $m^2g^{-1}$, adsorbs significant amount of $CO_2$ (63 $mgg^{-1}$ at 273 K). This is due to the presence of high percentage of ultra-micropores which are large enough for free passage of $CO_2$ gas molecules. On the other hand, $N_2$ gas molecules because of their slightly larger kinetic diameter are not suitable to enter within the ultra-micropores, resulting in significant drop in the surface areas estimated from $N_2$ adsorption isotherm. Smaller pores in PLP-1 also facilitate the stabilization of adsorbed carbon dioxide ($CO_2$) gas molecules, which pay off the significant lower surface area. However, the carbon dioxide ($CO_2$) uptake per unit surface area (Table 1) for PLP-1 surpasses any porous organic polymers so far reported, which indicates the superiority of the PLP-1 over other porous organic polymers.

TABLE 1

$CO_2$ uptake vs. surface area (SA) comparison for porous organic polymers

| Polymers | Surface (SA) ($m^2/g$) | $CO_2$ uptake (mg/g) 273K | 298K | $CO_2$ uptake/SA 273K | 298K | $Q_{ST}$ (kJ/mol) | Selectivity At 298K $CO_2$/C | $CO_2/N_2$ | Ref |
|---|---|---|---|---|---|---|---|---|---|
| BILP-5 | 599 | 128 | 87 | 0.21 | 0.15 | 29 | 6 | 36 | Ref[8] |
| BILP-7 | 1122 | 193 | 122 | 0.17 | 0.11 | 28 | 7 | 34 | Ref[8] |
| TBILP-1 | 330 | 117 | 78 | 0.35 | 0.24 | 35 | 9 | 63 | Ref[9] |
| TBILP-2 | 1080 | 228 | 146 | 0.21 | 0.14 | 29 | 7 | 40 | Ref[9] |
| TEM-1 | 738 | 73.1 | | 0.10 | | 27 | N/A | 29 | Ref[10] |

TABLE 1-continued

CO$_2$ uptake vs. surface area (SA) comparison for porous organic polymers

| Polymers | Surface (SA) (m$^2$/g) | CO$_2$ uptake (mg/g) 273K | 298K | CO$_2$ uptake/SA 273K | 298K | Q$_{ST}$ (kJ/mol) | Selectivity At 298K CO$_2$/C | CO$_2$/N$_2$ | Ref |
|---|---|---|---|---|---|---|---|---|---|
| TCMP-0 | 963 | 105 | 59 | 0.11 | 0.06 | N/A | N/A | N/A | Ref[11] |
| APOP-1 | 1298 | 188 | 118 | 0.14 | 0.09 | 27 | 5 | 20 | Ref[12] |
| PCTF-1 | 2235 | 145 | 89 | 0.06 | 0.04 | N/A | N/A | N/A | Ref[13] |
| TPI-1 | 809 | 107 | 55 | 0.13 | 0.07 | 34 | N/A | 31 | Ref[14] |
| PLP-1 | 24 | 63 | 44 | 2.63 | 1.83 | 36 | 35 | 140 | This work |
| GDP-1 | 563 | 85 | 55 | 0.15 | 0.098 | 34 | 22 | 132 | This work |
| BOLP-1 | 1215 | 175 | 102 | 0.14 | 0.084 | 32 | 21 | 47 | This work |
| BTLP-1 | 536 | 99 | 62 | 0.18 | 0.12 | 33 | 19 | 61 | This work |

In order to understand the high carbon dioxide (CO$_2$) affinity for the surface of PLP-1, GDP-1, BOLP-1 and BTLP-1, isosteric heats of adsorption (Q$_{ST}$) have been calculated using the virial method from the isotherms measured at 273 and 298K and are illustrated in FIGS. 20, 28, 36 and 44. The Q$_{ST}$ value of 36 kJ/mol for PLP-1 is among the highest for porous organic polymers (Table 1). Other three polymers also have high Q$_{ST}$ values which suggest the significant surface affinity towards the carbon dioxide gas molecules due to the presence of ultra-micropores and surface heterogeneity.

Given the high carbon dioxide (CO$_2$) uptake per unit surface area, and desirable binding affinity, the selective carbon dioxide (CO$_2$) capture over methane (CH$_4$) gas and nitrogen (N$_2$) gas (FIGS. 21, 29, 37, and 45) was studied in order to understand the practical use of PLP-1, GDP-1, BOLP-1 and BTLP-1 in carbon dioxide (CO$_2$) separation from an input gas, such as a landfill gas or a flue gas, among others. All polymers showed significantly low uptakes for both methane (CH$_4$) gas and nitrogen (N$_2$) gas compared to carbon dioxide (CO$_2$) uptake. The adsorption selectivity for carbon dioxide (CO$_2$) over methane (CH$_4$) gas and nitrogen (N$_2$) gas was then evaluated from Henry's law on initial slope calculations using the single component gas adsorption isotherms at 298 K, as shown in FIGS. 22, 30, 38, and 46. As illustrated, PLP-1 has 140 times greater selectivity for carbon dioxide (CO$_2$) than nitrogen (N$_2$) gas (CO$_2$/N$_2$ (140)) and 35 times greater selectivity for carbon dioxide (CO$_2$) than methane (CH$_4$) gas (CO$_2$/CH$_4$ (35)) at 298 K. These observed selectivity values for PLP-1 at 298 K far surpass any reported organic polymers (Table 1). In addition, the calculated selectivity for GDP-1 is 22 for CO$_2$/CH$_4$ and 132 for CO$_2$/N$_2$. Lower selectivity for BOLP-1 and BTLP-1 compared to GDP-1 and PLP-1 is presumably due to the less nitrogen heterogeneity in the pore apertures as well as larger percentage of PSD in upper micropore region which are still large enough to allow entry of all gas molecules under this study. It is assumed that the nitrogen centers in the polymer frame provide basicity to the frame which increases the acidic CO$_2$-philicity. On the other hand, the nitrogen centers in the frame increases N$_2$-phobicity resulting in less N$_2$ gas adsorption.[15]

In order to be industrially applicable for carbon dioxide (CO$_2$) separation from an input gas, such as a flue gas or landfill, gas, the regeneration properties of PLP-1, GDP-1, BOLP-1 and BTLP-1 were evaluated, for carbon dioxide (CO$_2$) at 298 K. The results shown in FIGS. 23, 31, 39 and 47 show successive six adsorption-desorption cycles which were measured successively without any extra efforts/steps employed for degassing the sample. The measurements were repeated once the prior measurement was completed. Each sample was normally automatically degassed for a few minutes by the machine once each cycle was completed. No extra effort was utilized either for a longer evacuation time or any heat treatment. Further in each case the last cycle was measured one week later after the first five consecutive cycles. As shown in FIGS. 23, 31, 39 and 47, there is no loss of carbon dioxide (CO$_2$) uptake within any of the six adsorption/desorption cycles which indicate the stability and the energy saving regeneration of the synthesized polymers.

High gas adsorption selectivity and easy regeneration properties are the attractive features for using the synthesized NRPOPs in making efficient membrane composites for gas separation applications. The membrane composites of these NRPOPs can be formed in a known manner such by direct casting the NRPOPs on flat glass plates or using spin coating methods. In a typical exemplary process, the NRPOP(s) can be suspended in a suitable matrix (e.g. polysulfone) dissolved in a suitable solvent (e.g. chloroform). The resulting suspension is then cast onto a flat glass plate to form the membrane composite, which is subsequently dried under vacuum at 100° C. overnight to obtain the membrane composites. Third method is the casting of membrane composite inside a fritted disk. Resulting doped frit is dried under vacuum at 100° C. overnight to obtain the frit doped with membrane composites.

The membrane composites formed in these and other manners can be tested for usefulness in gas separation by connecting the membrane between a gas mixture supply and a portable gas sensor. Gas from the gas mixture supply, such as a 50:50 mixture of methane and carbon dioxide, is passed into an inlet for the membrane assembly and the output is connected to the gas sensor to determine the amount of carbon dioxide retained by the membrane.

In addition to chemical and thermal stability, the heteroatomic surface functionality made the polymers attractive in preparation of heterogeneous catalysts using various compounds, such as various metal nanoparticles, including transition metal nanoparticle in certain exemplary embodiments, bonded to the support structure provided by the heteroatom (N,S,O)-rich porous organic polymers. Catalytic conversion of CO$_2$ to propiolic acid derivatives using silver nanocatalyst is a promising way to convert CO$_2$ to useful chemicals. Heteroatomic functionality, particularly, the presence of sulfur (S) BTLP-1 is expected to stabilize the silver nanocatalysts through the stable S→Ag dative bond. Synthesized BTLP-1 is used for the preparation of stable silver nanocatalyst (Ag@BTLP-1). In a typical preparation of nanocatalyst, activated BTLP-1 powder is immersed in acetonitrile containing silver nitrate (AgNO$_3$) and the mixture is then stirred at room temperature. After the impregnation, the suspension is centrifuged and the solid is dried at 100° C. under vacuum for overnight and then finally chemically reduced by NaBH$_4$. Resultant nanocatalyst is then dried and used in CO$_2$ catalytic reaction as shown in FIG. 48. Although the polymers have dominated pores in the ultra-micropore region as derived from CO$_2$ adsorption isotherms, there is still significantly larger pore size distribution in the mesopore region (2 to 50 nm) as seen in FIGS. 17, 25, 33 and 41 which are derived from nitrogen adsorption isotherms. These mesopores and the surface functionality with nitrogen, oxygen, and sulfur atoms make these polymers as promising in preparation of heterogeneous transition metal catalysts. In addition, the SEM images shows the aggregation of nanosize polymer particles. The surface of these smaller particles are fully available to anchor the catalytic metal centers.

REFERENCES

The following references are expressly incorporated by reference herein in their entirety for all purposes.
1. Overview of Greenhouse Gases: http://www3.epa.gov/climatechange/ghgemissions/gases/co2.html.
2. Baker R W, Lokhandwala K. Natural Gas Processing with Membranes: An Overview. *Industrial & Engineering Chemistry Research* 2008, 47(7): 2109-2121.
3. Kenarsari S D, Yang D. Jiang G, Zhang S. Wang J, Russell A G. et al. Review of recent advances in carbon dioxide separation and capture. *RSC Advances* 2013, 3(45): 22739-22773.
4. Yang H, Xu Z, Fan M, Gupta R, Slimane R B, Bland A E, et al. Progress in carbon dioxide separation and capture: A review. *Journal of Environmental Sciences* 2008, 20(1): 14-27.
5. ALGOMA ALGAL BIOTECHNOLOGY LLC, http://www.algomaalgal.com/.
6. Isoprene from Biomass: http://www.wisys.org/news-media/eric-singsaas.
7. Freedonia, Membrane Separation Technologies—Industry Study with Forecasts for 2016 & 2021. The Freedonia Group Inc, 2012. http://www.freedoniagroup.com/brochure/28xx/2872smwe.pdf.
8. Rabbani M G, El-Kaderi H M. Synthesis and Characterization of Porous Benzimidazole-Linked Polymers and Their Performance in Small Gas Storage and Selective Uptake. *Chemistry of Materials* 2012, 24(8): 1511-1517.
9. Sekizkardes A K, Altarawneh S, Kahveci Z, İslamoğlu T, El-Kaderi H M. Highly Selective CO2 Capture by Triazine-Based Benzimidazole-Linked Polymers. *Macromolecules* 2014, 47(23): 8328-8334.
10. Xu Y, Jin S, Xu H, Nagai A, Jiang D. Conjugated microporous polymers: design, synthesis and application. *Chemical Society Reviews* 2013, 42(20): 8012-8031.
11. Chang Z, Zhang D-S, Chen Q, Bu X-H. Microporous organic polymers for gas storage and separation applications. *Physical Chemistry Chemical Physics* 2013, 15(15): 5430-5442.
12. Dawson R, Cooper A I, Adams D J. Nanoporous organic polymer networks. *Progress in Polymer Science* 2012, 37(4): 530-563.
13. Dawson R. Stockel E, Hoist J R. Adams D J, Cooper A I. Microporous organic polymers for carbon dioxide capture. *Energy & Environmental Science* 2011, 4(10): 4239-4245.
14, Li P-Z, Zhao Y. Nitrogen-Rich Porous Adsorbents for CO2 Capture and Storage. *Chemistry—An Asian Journal* 2013, 8(8): 1680-1691.
15. Patel H A, Hyun Je S, Park J, Chen D P, Jung Y, Yavuz C T, et al. Unprecedented high-temperature CO2 selectivity in N2-phobic nanoporous covalent organic polymers. *Nat Commun* 2013, 4: 1357.
16. Schwab M G, Fassbender B, Spiess H W, Thomas A, Feng X, Mullen K. Catalyst-free Preparation of Melamine-Based Microporous Polymer Networks through Schiff Base Chemistry. *Journal of the American Chemical Society* 2009, 131(21): 7216-7217.

Various other embodiments of the invention are contemplated as being within the scope of the filed claims particularly pointing out and distinctly claiming the subject matter regarded as the invention.

The invention claimed is:

1. A composition of matter comprising a porous organic polymer having microporous apertures that are less than 2.0 nm in diameter therein, wherein the polymer is a phenazine-linked polymer (PLP), a glyoxal-derived polymer (GDP) formed by a method consisting of reacting an amine functional monomer with gylxoal, or a benzothiazole-linked polymer (BTLP).

2. The composition of claim 1 wherein the pores have an average diameter of between 0.25 nm and 0.6 nm.

3. The composition of claim 1 wherein the pores have an average diameter of between 0.35 nm and 0.5 nm.

4. The composition of claim 1 wherein the composition includes at least one of nitrogen, sulfur and oxygen heterogeneity in the structure of the polymer surrounding the pores.

5. The composition of claim 4 wherein the composition is a component of a gas separation membrane.

6. The composition of claim 5 wherein the composition has a measured adsorption selectivity for carbon dioxide (CO$_2$) molecules over methane (CH$_4$) molecules of at least 10.

7. The composition of claim 6 wherein the composition has a measured adsorption selectivity for carbon dioxide (CO$_2$) molecules over methane (CH$_4$) molecules of at least 19.

8. The composition of claim 6 wherein the composition has a measured adsorption selectivity for carbon dioxide (CO$_2$) molecules over nitrogen (N$_2$) molecules of at least 40.

9. The composition of claim 5 wherein the composition has a measured adsorption selectivity for carbon dioxide (CO$_2$) molecules over nitrogen (N$_2$) molecules of at least 80.

10. The composition of claim 9 wherein the composition has a measured adsorption selectivity for carbon dioxide (CO$_2$) molecules over nitrogen (N$_2$) molecules of at least 100.

11. The composition of claim 4 wherein the composition is heterogeneous catalyst.

12. The composition of claim 1 wherein the composition has the following formula:

13. The composition of claim 1 wherein the composition has the following formula:

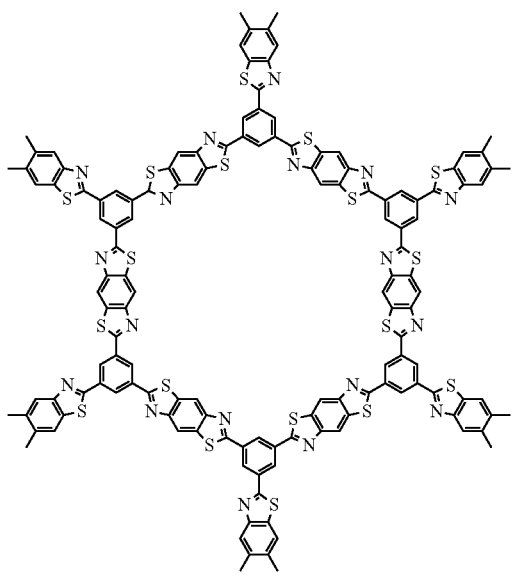

14. The composition of claim 1 wherein the composition has the following formula:

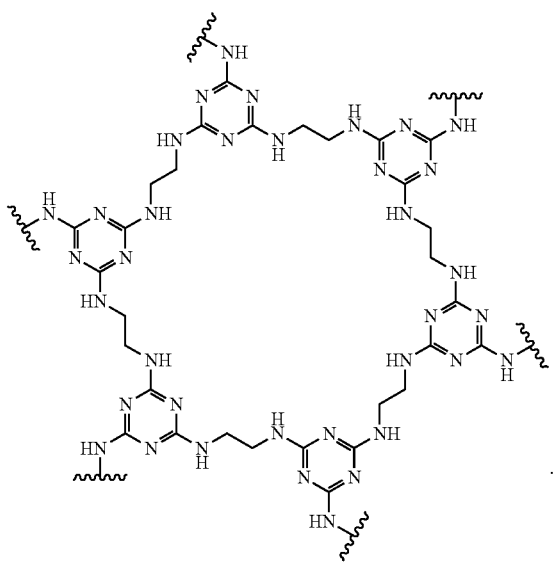 [SMILES: *Nc1nc2nc(n1)NCCNc1nc(N*)nc(n1)NCCNc1nc(N*)nc(n1)NCCNc1nc(N*)nc(n1)NCCNc1nc(N*)nc(n1)NCCNc1nc(N*)nc(n1)NCCN2]

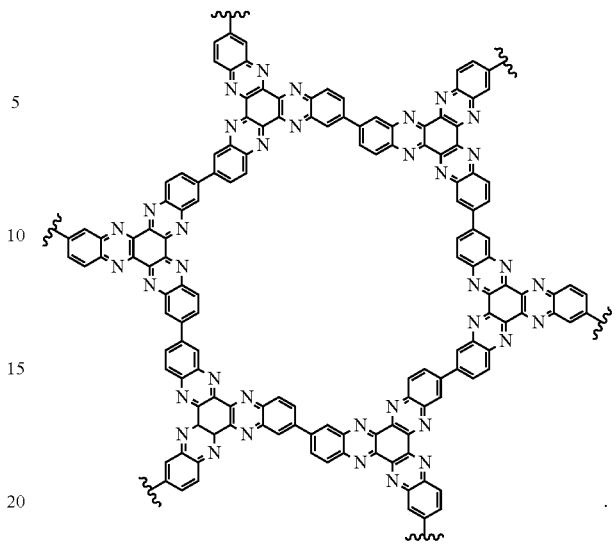

15. A method for removing carbon dioxide gas from an input gas stream, the method comprising the steps of:
 a) providing the composition of claim 1;
 b) passing the input gas stream through the composition; and
 c) removing carbon dioxide gas molecules from the input gas stream.

16. The method of claim 15 wherein the step of removing the carbon dioxide gas molecules from the input gas stream comprises adsorbing the carbon dioxide molecules onto the composition.

17. The method of claim 16 further comprising the steps of:
 a) desorbing the carbon dioxide molecules from the composition; and
 b) passing additional input gas through the composition to adsorb additional carbon dioxide molecules onto the composition.

18. A method of initiating a catalytic conversion reaction; the method comprising the steps of:
 a) providing the polymer composition of claim 1;
 b) reacting the polymer composition with a transition metal to form a heterogeneous catalyst; and
 c) placing the heterogeneous catalyst in contact with reactants to catalyze the $CO_2$ conversion reaction.

19. The method of claim 18 wherein the composition includes at least one of nitrogen, sulfur and oxygen heterogeneity in the structure of the polymer surrounding the pores.

* * * * *